US012808254B2

(12) United States Patent
Glover et al.

(10) Patent No.: US 12,808,254 B2
(45) Date of Patent: Nov. 24, 2026

(54) BARRIERS CORES AND ASSEMBLY THEREOF

(71) Applicant: AADG, INC., New Haven, CT (US)

(72) Inventors: Daniel Brian Glover, Franklin, TN (US); Thomas Rattay, Mason City, IA (US); David Richard Bill, Clear Lake, IA (US)

(73) Assignee: AADG, INC., New Haven, CT (US)

( * ) Notice: Subject to any disclaimer, the term of this patent is extended or adjusted under 35 U.S.C. 154(b) by 246 days.

(21) Appl. No.: 18/489,964

(22) Filed: Oct. 19, 2023

(65) Prior Publication Data

US 2024/0133228 A1 Apr. 25, 2024
US 2024/0229543 A9 Jul. 11, 2024

Related U.S. Application Data

(60) Provisional application No. 63/417,822, filed on Oct. 20, 2022.

(51) Int. Cl.
*E06B 3/70* (2006.01)

(52) U.S. Cl.
CPC .... *E06B 3/7015* (2013.01); *E06B 2003/7051* (2013.01)

(58) Field of Classification Search
CPC ....................... E06B 2003/7074; E06B 3/7015
(Continued)

(56) References Cited

U.S. PATENT DOCUMENTS

| | | |
|---|---|---|
| 2,541,871 A | 2/1951 | Gustaf et al. |
| 2,818,947 A | 1/1958 | Goldberg |

(Continued)

FOREIGN PATENT DOCUMENTS

| | | |
|---|---|---|
| AT | 390474 B | 5/1990 |
| CH | 706060 A1 | 7/2013 |

(Continued)

OTHER PUBLICATIONS

Maxineasa et al. "Life cycle analysis of strengthening concrete beams with FRP" section 24.3.1.4 Basalt Fibers—retrieved via Science Direct topic overview "Basalt Fiber" on Mar. 20, 2023 (Year: 2018).

(Continued)

*Primary Examiner* — Paola Agudelo
(74) *Attorney, Agent, or Firm* — Moore & Van Allen PLLC; Jeffrey R. Gray

(57) ABSTRACT

Barriers may utilize cores that may be pre-assembled and dropped into a barrier or may be formed within the barriers. The cores may include traditional core materials, biomass materials, graphite polystyrene (GPS) material, or other types of materials. The core may be formed from one or more layers, such as one or more stiffener layers (e.g., stiffener panel, stiffener rods, or the like), one or more matrix layers (e.g., with apertures extending therein), one or more solid layers (e.g., wood, plastic, composite, foam, fiber, or the like), one or more fluid sealed layers (e.g., air, argon, nitrogen, or other like), and/or other types of layers. The barrier edge members, the faces, and/or the core layers described herein may be assembled to each other in traditional ways, such as welding, and/or may be assembled to each other in a way that reduces the amount of welding and/or use of steel.

20 Claims, 28 Drawing Sheets

(58) Field of Classification Search
USPC .......................................................... 52/784.1
See application file for complete search history.

(56) References Cited

U.S. PATENT DOCUMENTS

| | | | | |
|---|---|---|---|---|
| 2,869,695 | A | 1/1959 | Herr et al. | |
| 3,060,522 | A | 10/1962 | Parker | |
| 3,083,798 | A | 4/1963 | Sklar | |
| 3,239,978 | A | 3/1966 | John | |
| 3,252,262 | A | 5/1966 | Jessen | |
| 3,546,841 | A | 12/1970 | Smith et al. | |
| 3,834,101 | A | 9/1974 | Wilder et al. | |
| 3,886,688 | A | 6/1975 | Ragland | |
| 4,223,494 | A | 9/1980 | Wendt | |
| 4,719,729 | A | 1/1988 | Wynar | |
| 5,221,807 | A * | 6/1993 | Vives | F41H 5/023 109/82 |
| 5,349,893 | A * | 9/1994 | Dunn | F41H 5/04 428/116 |
| 5,441,779 | A | 8/1995 | Lafond | |
| 5,447,761 | A | 9/1995 | Lafond | |
| 5,528,865 | A | 6/1996 | Johnson et al. | |
| 5,619,823 | A | 4/1997 | Ruff et al. | |
| 6,568,310 | B2 * | 5/2003 | Morgan | F41H 5/0457 89/36.01 |
| 8,171,700 | B2 | 5/2012 | Barnes | |
| 8,316,620 | B2 | 11/2012 | Cotlet et al. | |
| 8,333,049 | B2 | 12/2012 | Badger | |
| 8,955,254 | B1 | 2/2015 | Ewoldt | |
| 10,060,181 | B1 | 8/2018 | Jones, Jr. et al. | |
| 10,435,940 | B2 | 10/2019 | Gilliam | |
| 10,774,576 | B1 | 9/2020 | Vonnahme et al. | |
| 2001/0003889 | A1 * | 6/2001 | Zen | E06B 3/822 52/506.01 |
| 2003/0200714 | A1 | 10/2003 | Minke et al. | |
| 2007/0094935 | A1 | 5/2007 | Molinari | |
| 2008/0016820 | A1 | 1/2008 | Robbins et al. | |
| 2008/0222963 | A1 * | 9/2008 | Zwart | G07C 9/00944 70/277 |
| 2010/0024309 | A1 | 2/2010 | Tavarez | |
| 2010/0257802 | A1 | 10/2010 | Strickland et al. | |
| 2011/0091713 | A1 * | 4/2011 | Miller | E04B 1/942 428/312.2 |
| 2011/0227743 | A1 | 9/2011 | Kilbourne | |
| 2011/0232192 | A1 | 9/2011 | Miller | |
| 2013/0255183 | A1 | 10/2013 | Briggs, Jr. et al. | |
| 2014/0054107 | A1 * | 2/2014 | Thomas | E06B 3/7017 181/290 |
| 2014/0360416 | A1 | 12/2014 | Deiler | |
| 2015/0268010 | A1 | 9/2015 | Strauss | |
| 2015/0369568 | A1 | 12/2015 | Nielsen | |
| 2016/0380345 | A1 * | 12/2016 | Kolak | H01Q 1/422 343/872 |
| 2018/0051508 | A1 | 2/2018 | Glover | |
| 2018/0066429 | A1 | 3/2018 | Yau et al. | |
| 2018/0087315 | A1 | 3/2018 | Glover | |
| 2018/0087879 | A1 * | 3/2018 | Glover | B32B 5/20 |
| 2018/0320435 | A1 * | 11/2018 | Bertovic | E06B 3/7005 |
| 2019/0120507 | A1 * | 4/2019 | Vaslag | E04B 1/34807 |
| 2019/0264437 | A1 * | 8/2019 | Labala | E04B 1/3483 |
| 2021/0055080 | A1 * | 2/2021 | Glover | B32B 5/18 |
| 2021/0246710 | A1 | 8/2021 | Ko | |
| 2023/0265709 | A1 * | 8/2023 | Andary | E06B 3/7015 52/309.15 |
| 2024/0183156 | A1 * | 6/2024 | Ayangbile | E04C 2/246 |

FOREIGN PATENT DOCUMENTS

| | | | |
|---|---|---|---|
| CN | 1902373 | A | 1/2007 |
| CN | 209924857 | U | 1/2020 |
| CN | 111577070 | A | 8/2020 |
| DE | 2119863 | A1 | 10/1972 |
| GB | 2258685 | A | 2/1993 |
| WO | 2013092626 | A1 | 6/2013 |
| WO | 2018063905 | A1 | 4/2018 |
| WO | 2018063986 | A1 | 4/2018 |

OTHER PUBLICATIONS

Foamtech North America Ltd., Alufoam, 1 page.
Firestone Fibers & Textiles Company, Product Code: Basalt—Innegra Woven Fabric (FIR-BIT78-60), 1 page.
Honeywell, Spectra®, Technology / Innovation / Investigation VOC: Ultra-Light Weight Ballistic Protection—Fabrics / Sheet Materials, Jan. 21, 2020, 5 pages.
Ray-Bar Ultra-Light Weight UL 752 Level 8 Ballistic Panel, https://www.raybar.com/ballistic-products/ray-bar-ballistic-resistant-metal-doors, 1 page.
Skarr Armor, High Strength UHMWPE Ballistic Fabric 48"x65" NIJ IIIA Capable, 1 page.
AADG, Inc., International Patent Application No. PCT/US2023/077259, International Preliminary Report on Patentability, May 1, 2025.
AADG, Inc., International Patent Application No. PCT/US2023/077259, Invitation to Pay Additional Fees And, Where Applicable, Protest Fee, Feb. 9, 2024.
AADG, Inc., International Patent Application No. PCT/US2023/077259, International Search Report and Written Opinion, Apr. 3, 2024.

* cited by examiner

BARRIERS CORES AND ASSEMBLY THEREOF

PRIORITY CLAIM UNDER 35 U.S.C. § 119

This application claims priority to U.S. Provisional Application No. 63/417,822 entitled "Barriers With Mechanical Assembly and Layered Cores" filed on Oct. 20, 2022, which is assigned to the assignee hereof and the entirety of which is incorporated by reference herein.

FIELD

Embodiments of the present disclosure generally relate to barrier systems, in particular, embodiments of the disclosure relate to doors or other barriers that have improved cores and potentially are mechanically assembled to reduce the use of steel, welding, and/or the carbon footprint of the barrier.

BACKGROUND

Barriers, such as doors, typically include many components with a larger carbon footprint that requires large amounts of energy, large amounts of water, results in large amount of waste, utilizes chemicals for forming or cleaning, requires thick areas and metal continuity between components for welding, are heavy, and/or include other requirements for raw materials, manufacturing and assembling the components of the barriers that are less environmentally friendly. There is a need for improved barrier components and barriers systems that are environmentally friendly.

SUMMARY

As will be described herein, the barrier systems of the present disclosure may utilize improved cores that may be secured by one or more edge support members (described in further detail below), dropped into the barrier, poured as a liquid that hardens, applied as an expandable material, or the like, which may include traditional core materials, biomass materials (e.g., hemp material, other biomass fibrous materials, or the like), graphite polystyrene (GPS) material, carbonized foam, or other types of materials. In some applications the core may be formed from one or more layers, such as one or more stiffener layers (e.g., panel with ribs, stiffener rods, or the like), one or more matrix layers (e.g., panel with apertures extending at least partially into the panel, such as a honeycomb, or the like), one or more solid layers (e.g., wood, plastic, composite, foam, fiber, or the like), one or more fluid sealed layers (e.g., air, argon, nitrogen, or other like gas or liquid sealed chamber), and/or other types of one or more layers. Each of the layers described herein may be made from traditional materials, such as steel, or may be made from alternate materials that reduce the amount of steel or carbon content used within the barrier. Moreover, the barrier edge members, the faces, and/or the core layers described herein may be assembled to each other in traditional ways, such as welding, and/or may be assembled to each other in a way that reduces the amount of welding, use of steel, and/or carbon footprint of the barrier.

As will be described herein, the improved cores may be utilized in traditional barriers (e.g., doors) that utilize welded connections to assemble the barrier. However, it should be understood that the barriers may use mechanical (e.g., fasteners, or the like), chemical (e.g., adhesives, VHBS tapes, or the like), or other types of connections, as will be described herein, in order to aid in reducing the welding needed to assemble the barriers (e.g., minimizing or eliminating the need for welding, or the like). As such, in some embodiments the one or more barriers may utilize edge support members (e.g., H-shaped, C-shaped, U-shape, or the like members) that may be mechanically coupled together through the use of edge couplings. The edge couplings may include tie members, bearing members, fasteners (e.g., nuts, screws, bolts, or the like) that may be used to mechanically assemble the edge support members together. Moreover, the edge support members may have one or more projections that allow for assembling the faces of the barrier to the edge members. Additionally, one or more edge covers may be utilized to hide the edge couplings after the edge couplings are engaged to assemble the barrier.

One embodiment of the invention is a barrier comprising a first face, a second face operatively coupled to the first face, and a core located between the first face and the second face. In further accord with embodiments, the barrier is a door.

In other embodiments, the core comprises one or more layers, and wherein the one or more layers comprise one or more stiffener layers, one or more matrix layers, one or more solid layers, or one or more fluid seal layers.

In still other embodiments, the one or more layers comprise at least one stiffener layer and at least one solid layer. The at least one stiffener layer comprises two or more stiffener rods located within the at least one solid layer.

In yet other embodiments, the one or more layers comprise at least one stiffener layer and at least one solid layer. The at least one stiffener layer comprises a stiffener panel with a plurality of ribs operatively coupled to the at least one solid layer.

In other embodiments, the one or more layers comprise at least one matrix layer, wherein the at least one matrix layer comprises a plurality of apertures extending at least partially into matrix layer.

In further accord with embodiments, the matrix layer is a first matrix layer and the plurality of apertures are a plurality of first apertures that extend in a first orientation, and wherein the one or more matrix layers further comprises a second matrix layer having a plurality of second apertures extending in a second orientation. The first matrix layer and the second matrix layer are stacked and the first orientation of the plurality of first apertures and the second orientation of the plurality of second apertures are different orientations.

In other embodiments, the one or more solid layers comprise a wood, a plastic, a composite, a paper, or a fiber layer.

In still other embodiments, the one or more fluid sealed layers comprise a sealed chamber having a fluid within the sealed chamber, and wherein the fluid comprises air, argon, or nitrogen.

In yet other embodiments, the one or more layers are formed from a graphite polystyrene (GPS) material.

In other embodiments, the one or more layers are formed from a biomass material.

In further accord with embodiments, the biomass material is hemp.

In other embodiments, the first face or the second face at least partially form one or more edge members of the barrier.

In still other embodiments, the barrier further comprises one or more edge support members operatively coupled to the first face or the second face and surrounding the core.

In yet other embodiments, the edge support members comprises a top edge support member, a bottom edge support member, a lock edge support member, and a hinge edge support member.

In other embodiments, the edge support members are operatively coupled through edge couplings, and wherein the edge couplings are mechanical fasteners In further accordance with embodiments, the one or more edge support members comprise a first flange, a second flange, and a web operatively coupling the first flange with the second flange. The first flange, the second flange, and the web form one or more cavities for receiving a core of a barrier or an edge coupling.

In other embodiments, the first flange, the second flange, and the web of the one or more of the edge support members form an H-shaped edge support member having an outer channel and an inner channel. The inner channel of the H-shaped support member receives a portion of the core.

Another embodiment of the invention is a method of assembling a barrier assembly. The method comprises assembling a core comprising one or more stiffener layers, one or more matrix layers, one or more solid layers, or one or more fluid seal layers. The method further comprises assembling a first face to the core and a second face.

In further accord with embodiments, the one or more layers comprise at least one stiffener layer and at least one solid layer. The at least one stiffener layer comprises a stiffener panel with a plurality of ribs operatively coupled to the at least one solid layer.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1:
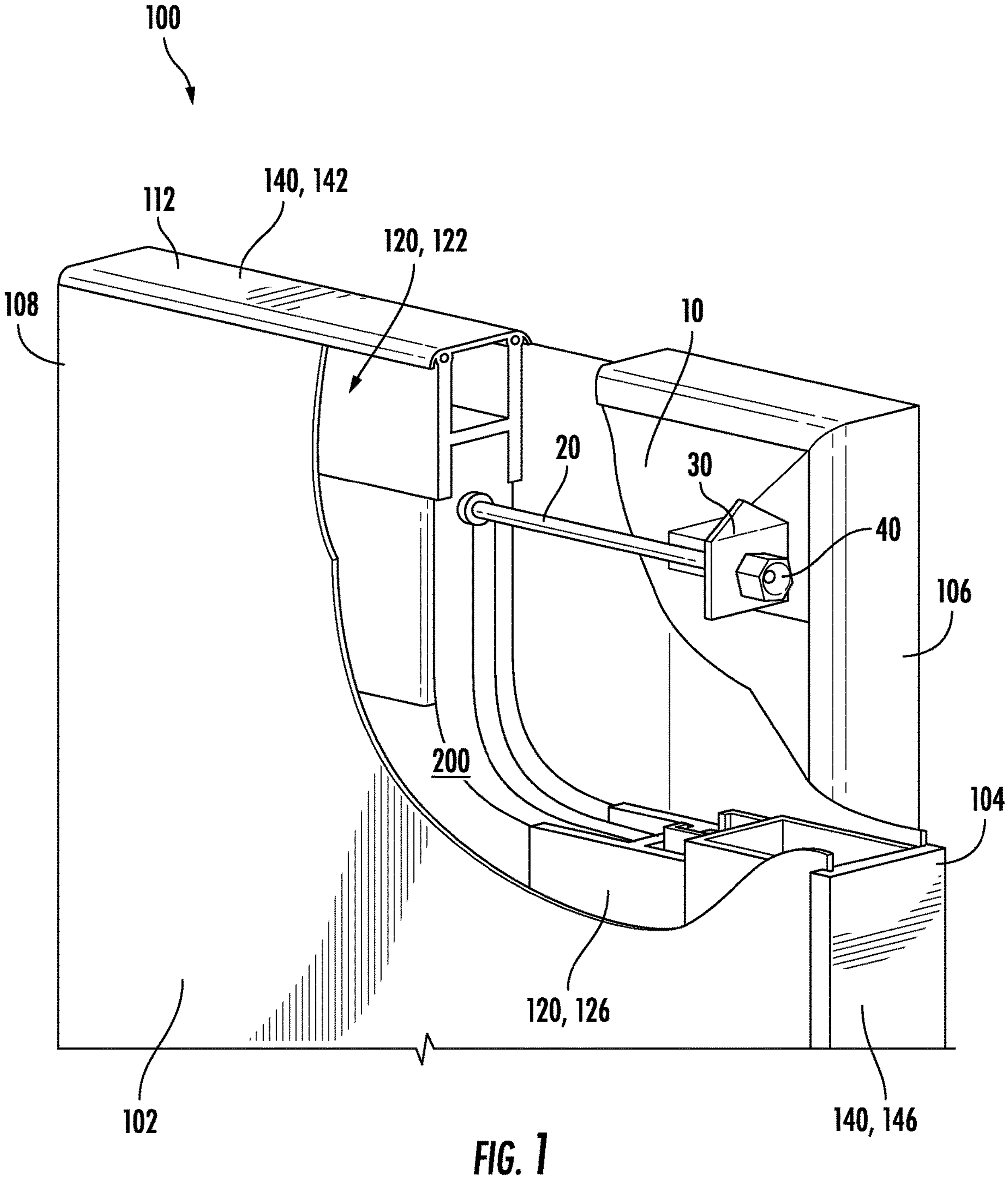

FIG. 1 illustrates a perspective view of a door with components partially removed, in accordance with some embodiments of the present disclosure.

Figure 2:
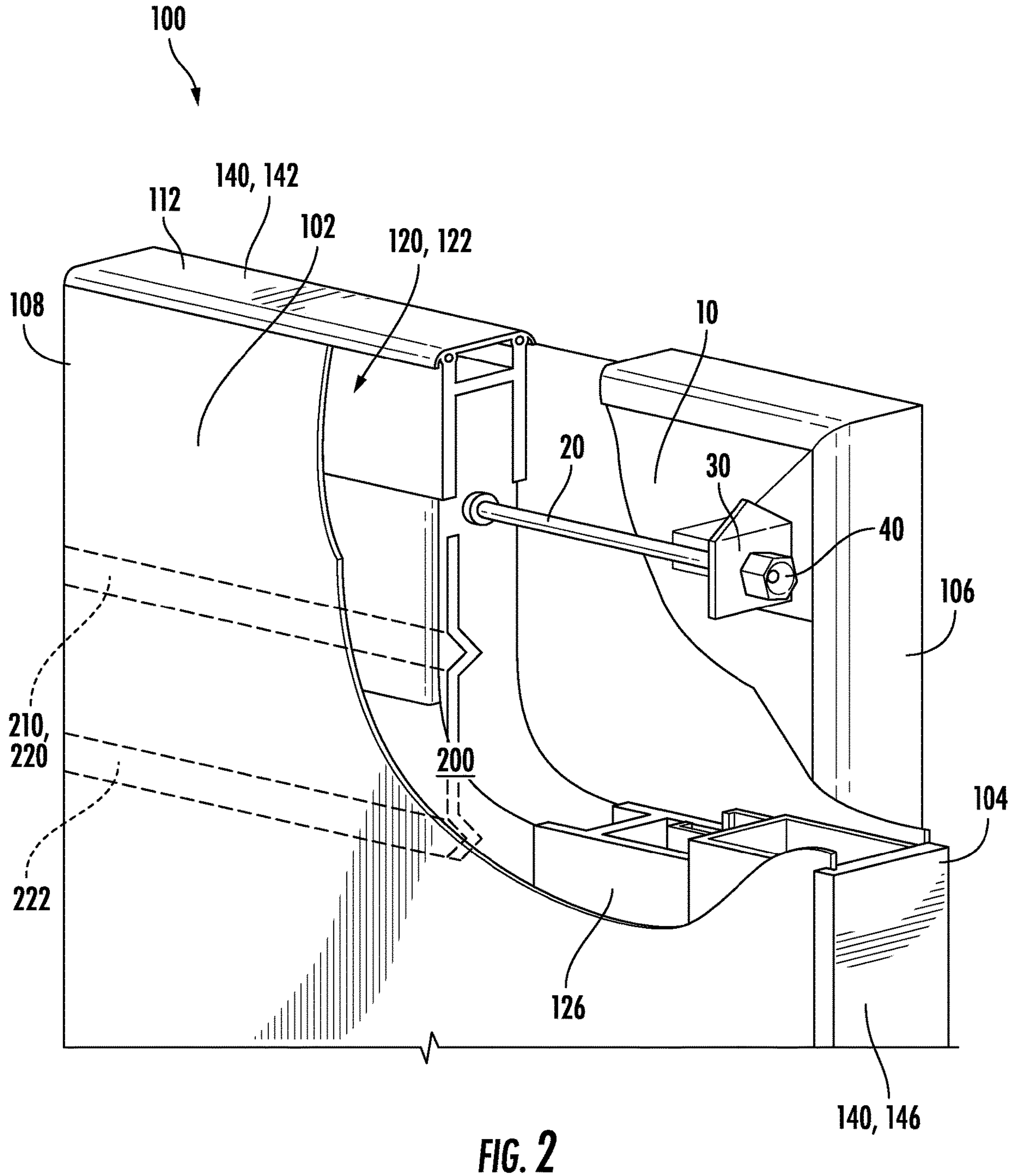

FIG. 2 illustrates a perspective view of a door with components partially removed that utilizes a core with at least a stiffener layer having horizontal ribs, in accordance with some embodiments of the present disclosure.

Figure 3:
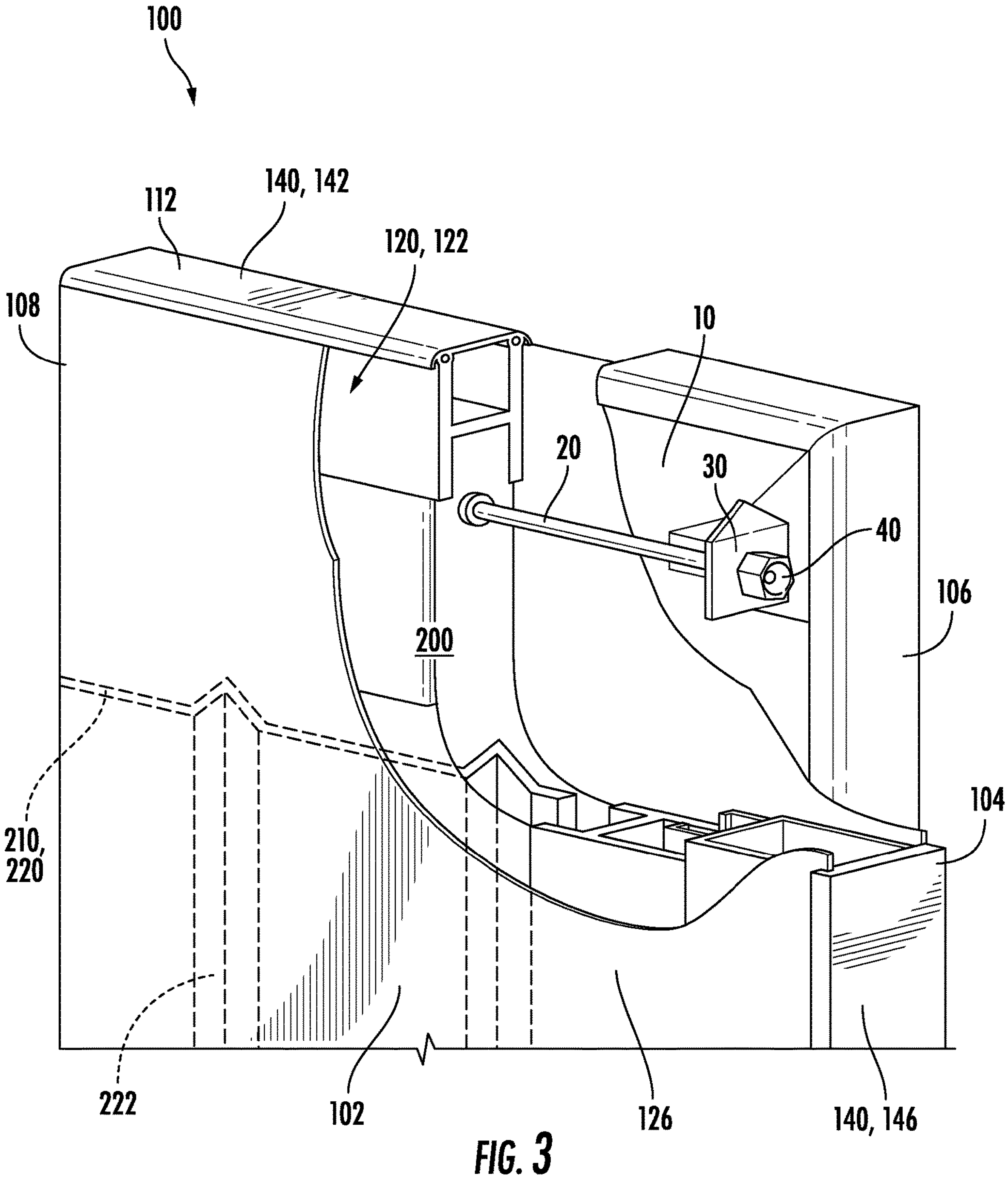

FIG. 3 illustrates a perspective view of a door with components partially removed that utilizes a core with at least a stiffener layer having vertical ribs, in accordance with some embodiments of the present disclosure.

Figure 4:
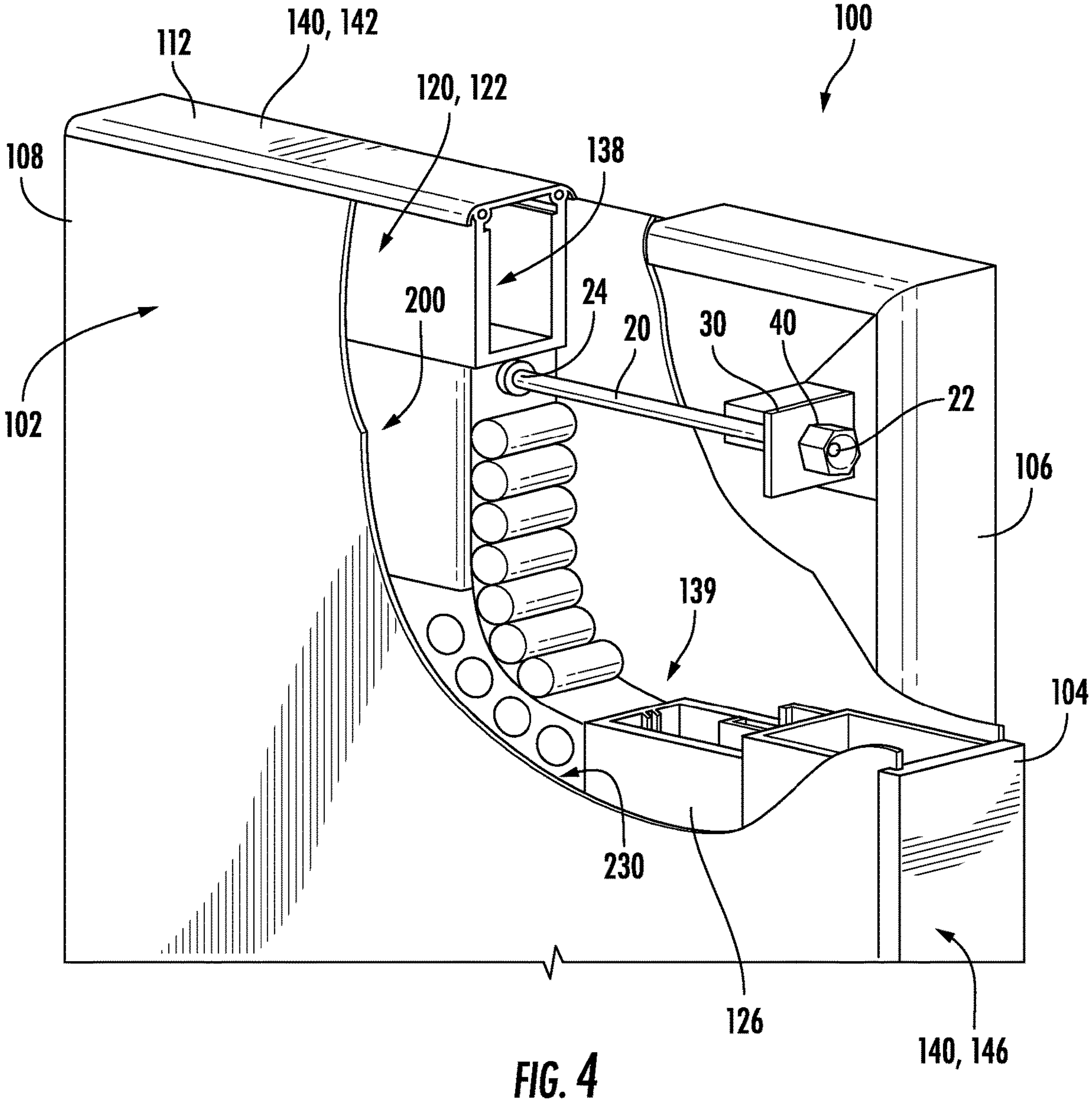

FIG. 4 illustrates a perspective view of a door with components partially removed that utilizes a core with at least a matrix layer, in accordance with some embodiments of the present disclosure.

Figure 5:
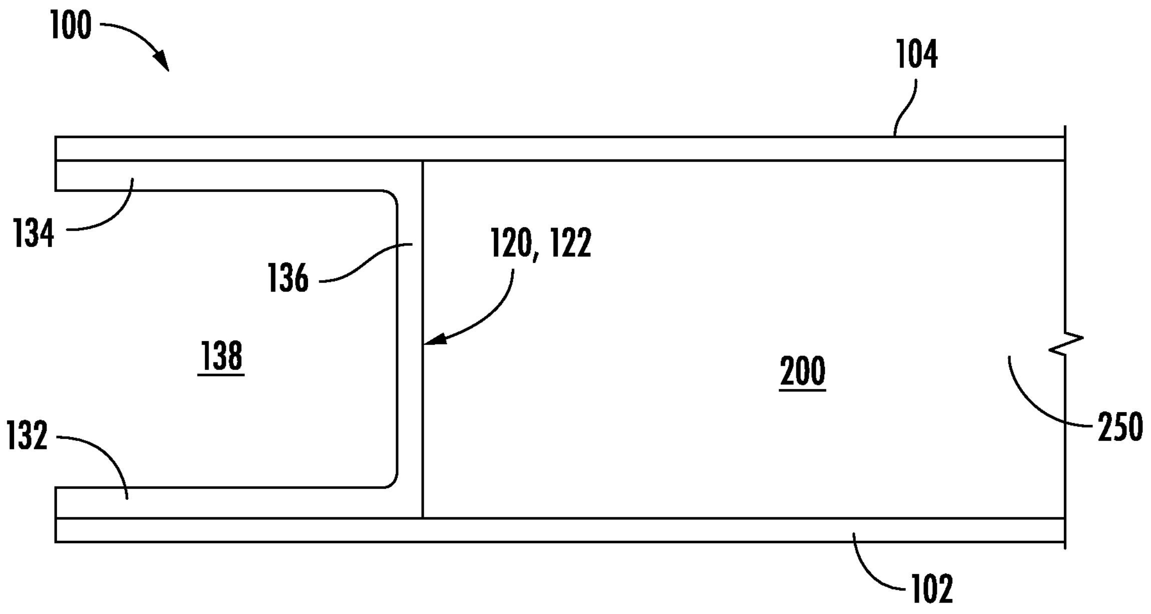

FIG. 5 illustrates a cross-sectional view of a door that utilizes a u-shaped edge member, in accordance with some embodiments of the present disclosure.

Figure 6:
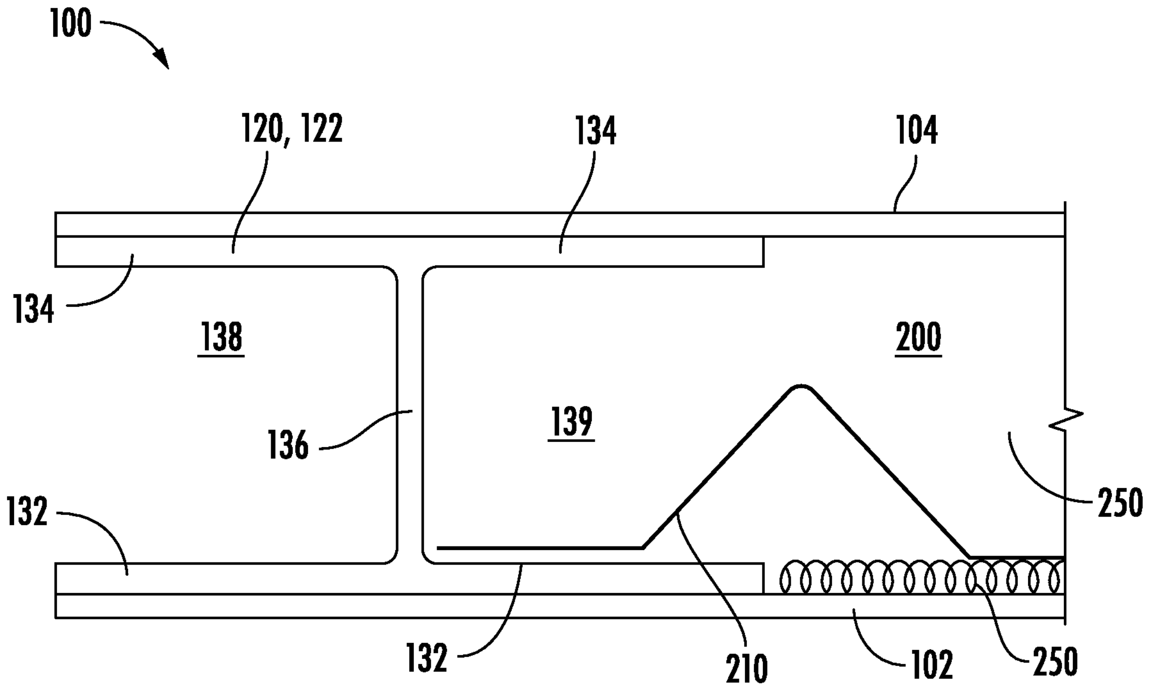

FIG. 6 illustrates a cross-sectional view of a door that utilizes an H-shaped edge member with an open outer channel, in accordance with some embodiments of the present disclosure.

Figure 7A:
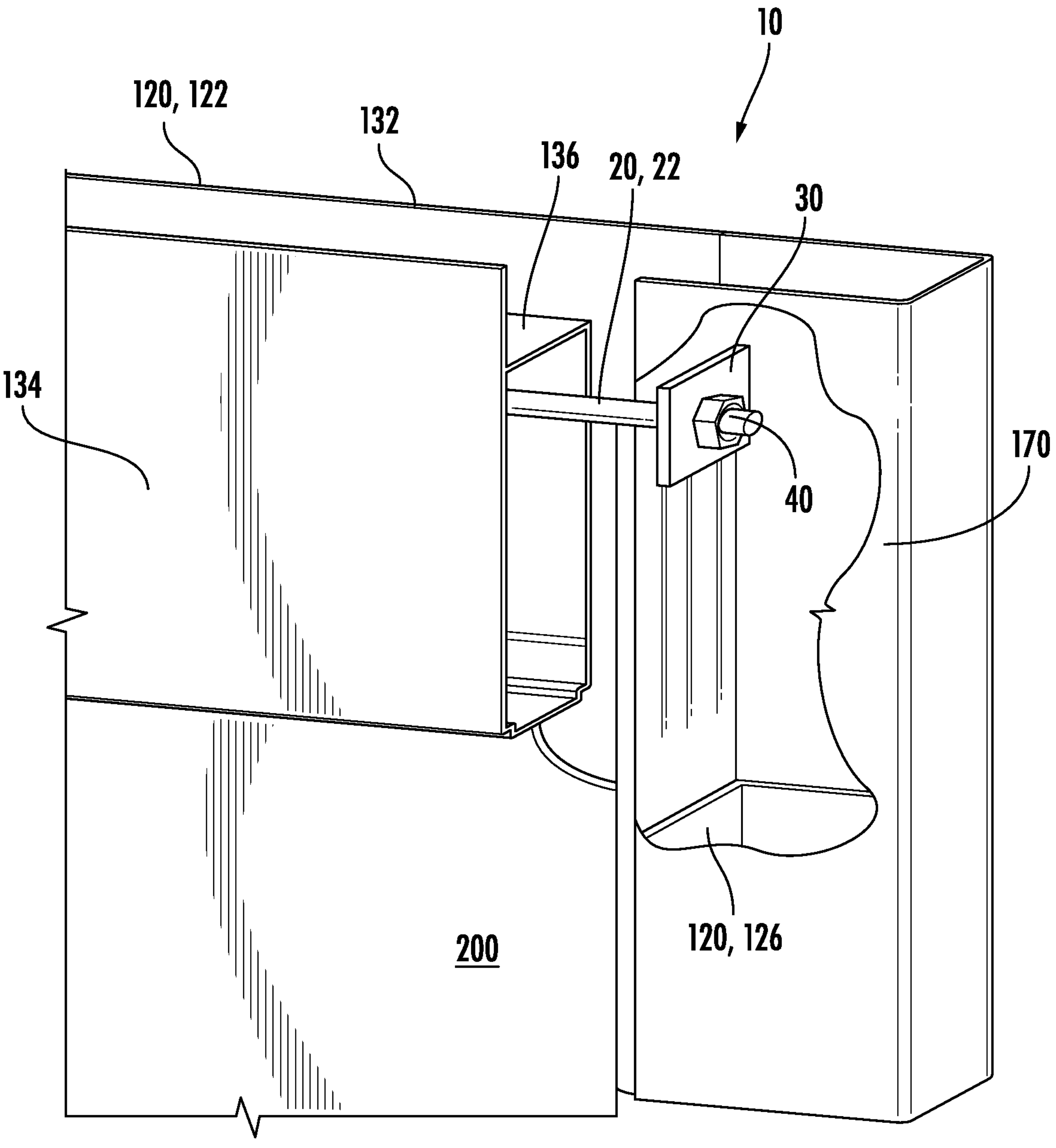

FIG. 7A illustrates a perspective view of a door that utilizes an H-shaped edge member with a closed outer channel, in accordance with some embodiments of the present disclosure.

Figure 7B:
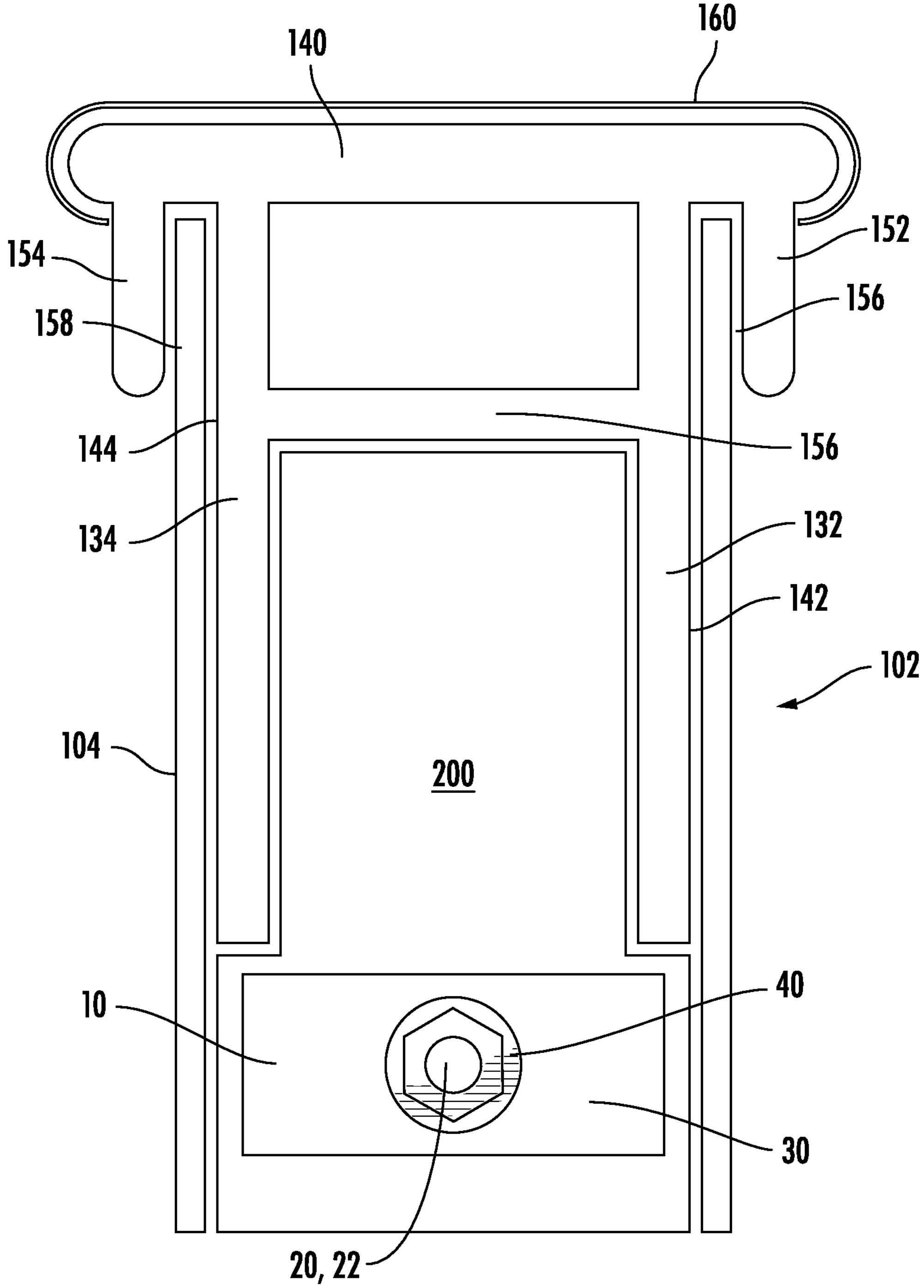

FIG. 7B illustrates a cross-sectional view of a door that utilizes an H-shaped edge member with a closed outer channel and edge couplings, in accordance with some embodiments of the present disclosure.

Figure 8:
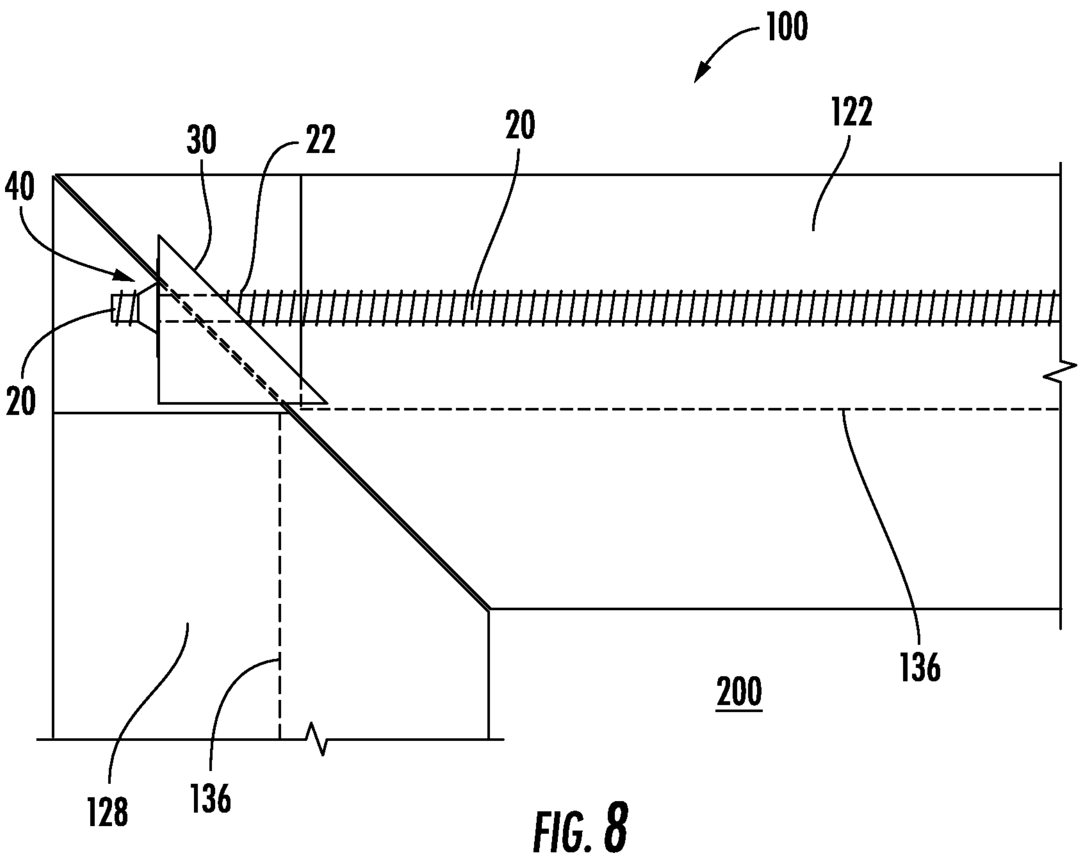

FIG. 8 illustrates a cross-sectional view of a door that utilizes H-shaped edge members and edge couplings, in accordance with some embodiments of the present disclosure.

Figure 9:
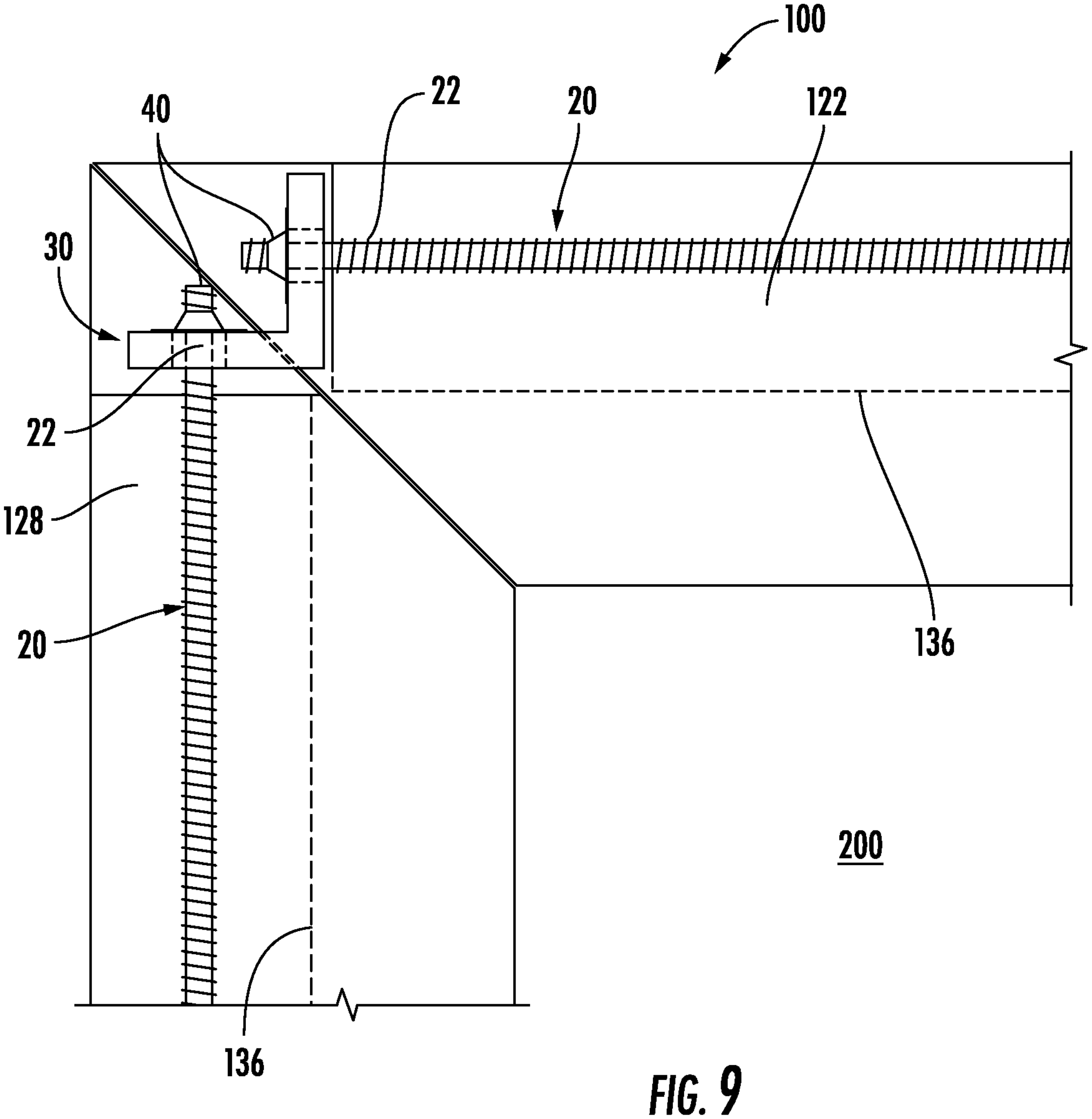

FIG. 9 illustrates a cross-sectional view of a door that utilizes H-shaped edge members and edge couplings, in accordance with some embodiments of the disclosure.

Figure 10:
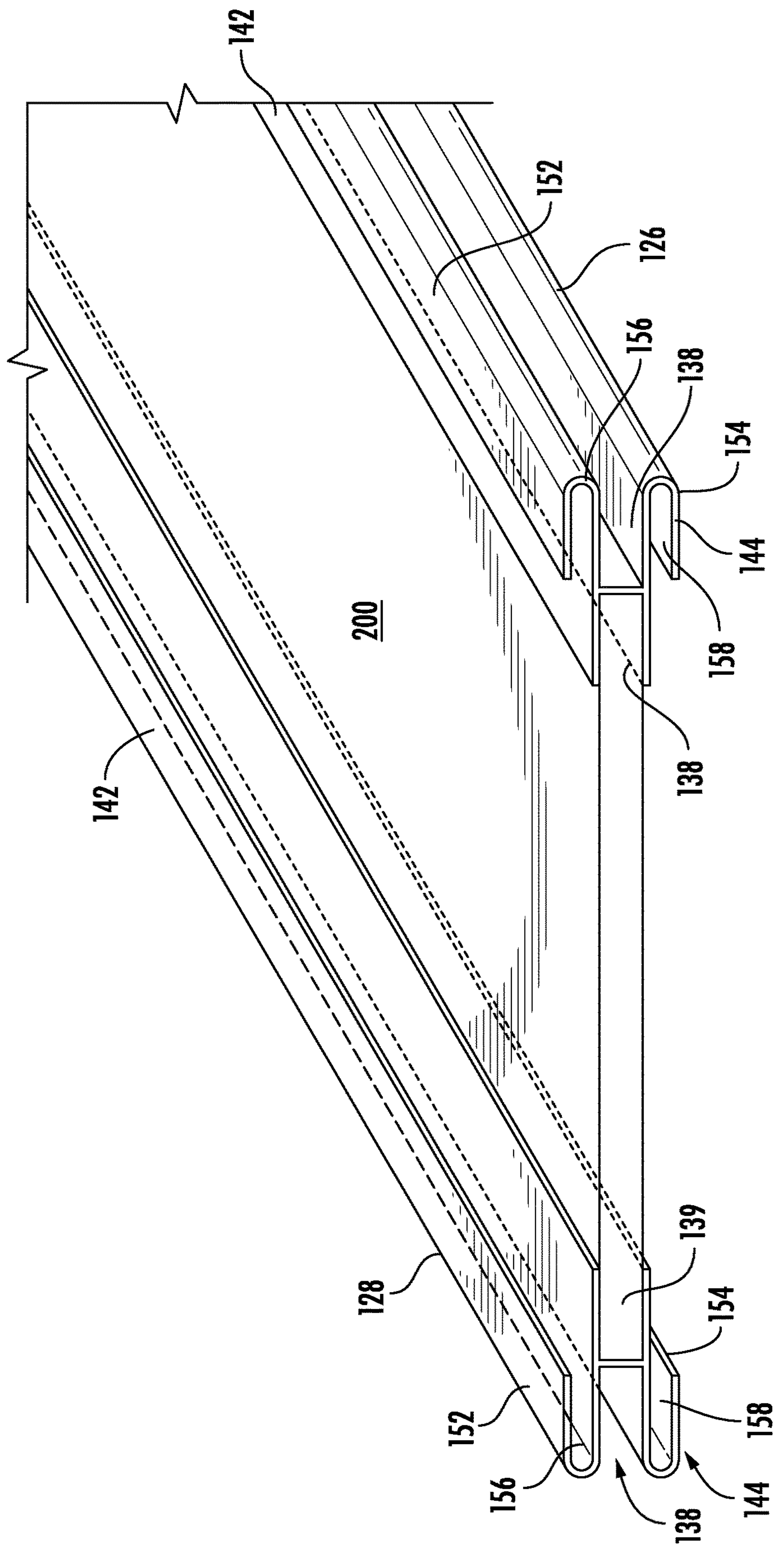

FIG. 10 illustrates a perspective view of a hinge edge member and lock edge member with a core located therebetween, in accordance with some embodiments of the present disclosure.

Figure 11B:
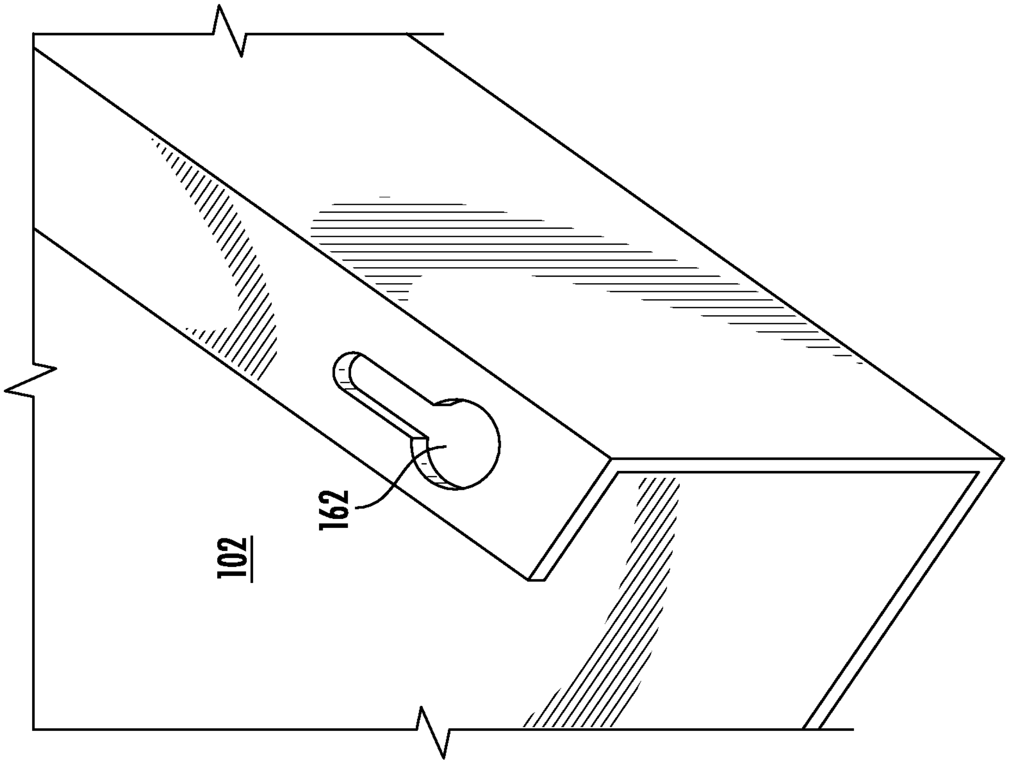
Figure 11A:
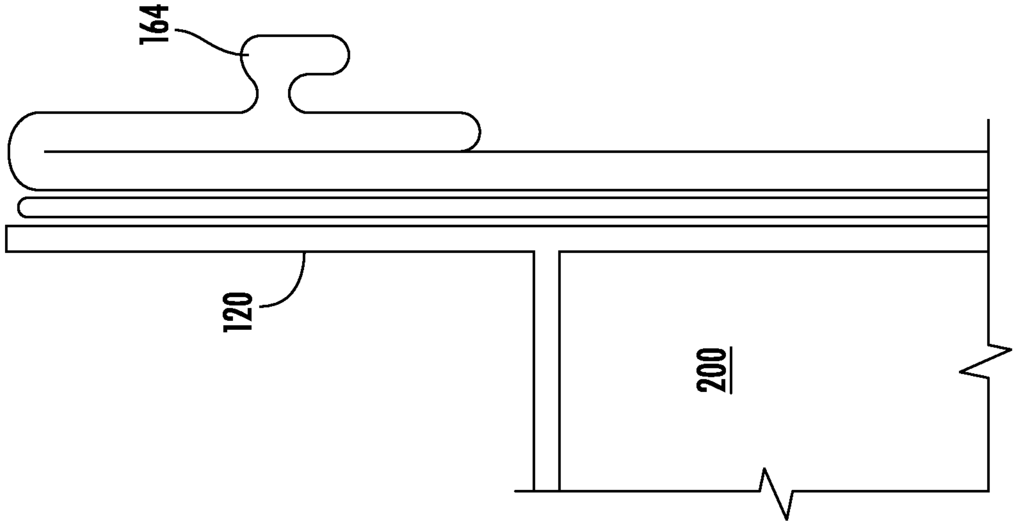

FIG. 11A illustrates a cross-sectional view of a portion of an edge member having a tab for coupling of a door face, in accordance with some embodiments of the disclosure.

FIG. 11B illustrates a cross-sectional view of a portion of a door face with an aperture for operative coupling with an edge member, in accordance with some embodiments of the present disclosure.

Figure 11C:
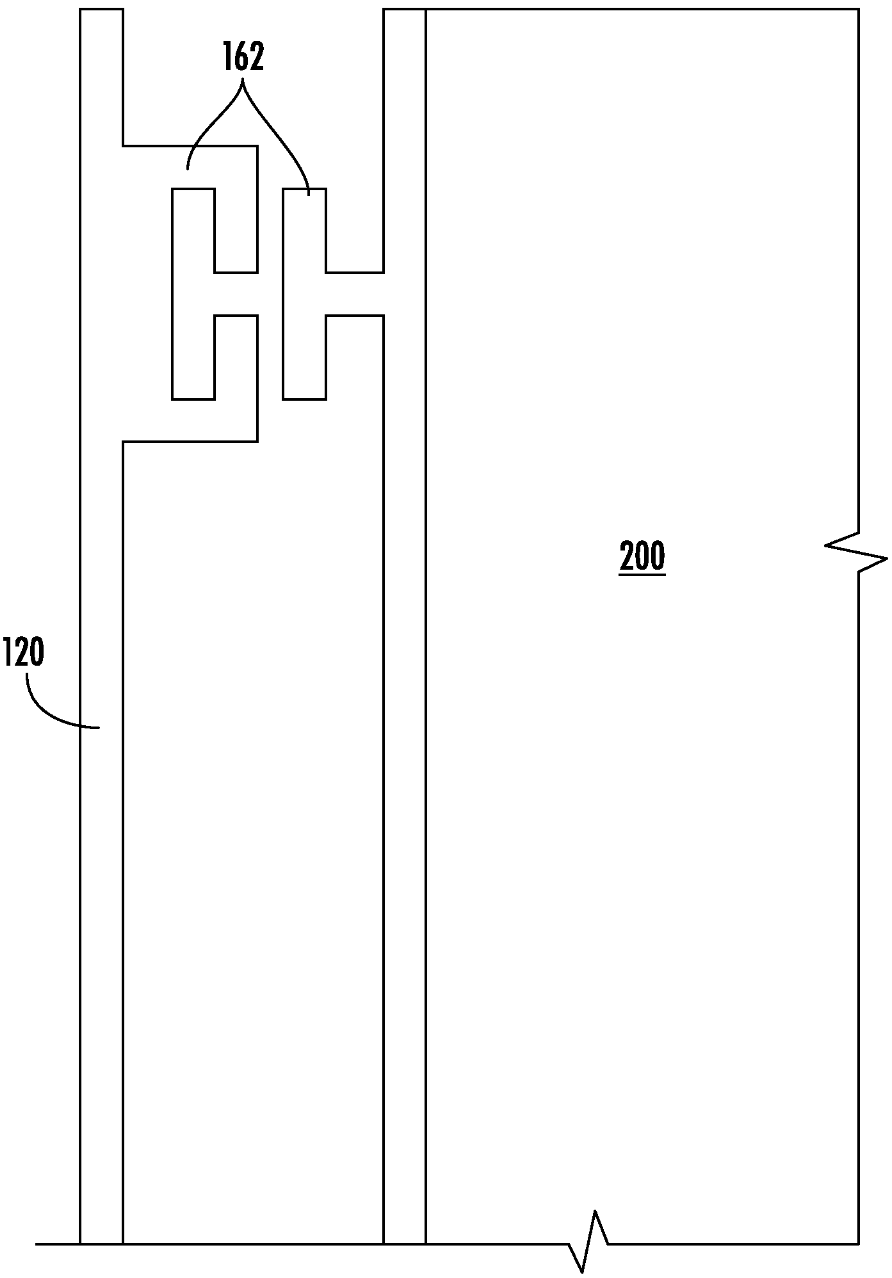

FIG. 11C illustrates a cross-sectional view of a portion of a core having a tab used for operative coupling with a channel of a door face, in accordance with some embodiments of the present disclosure.

Figure 12A:
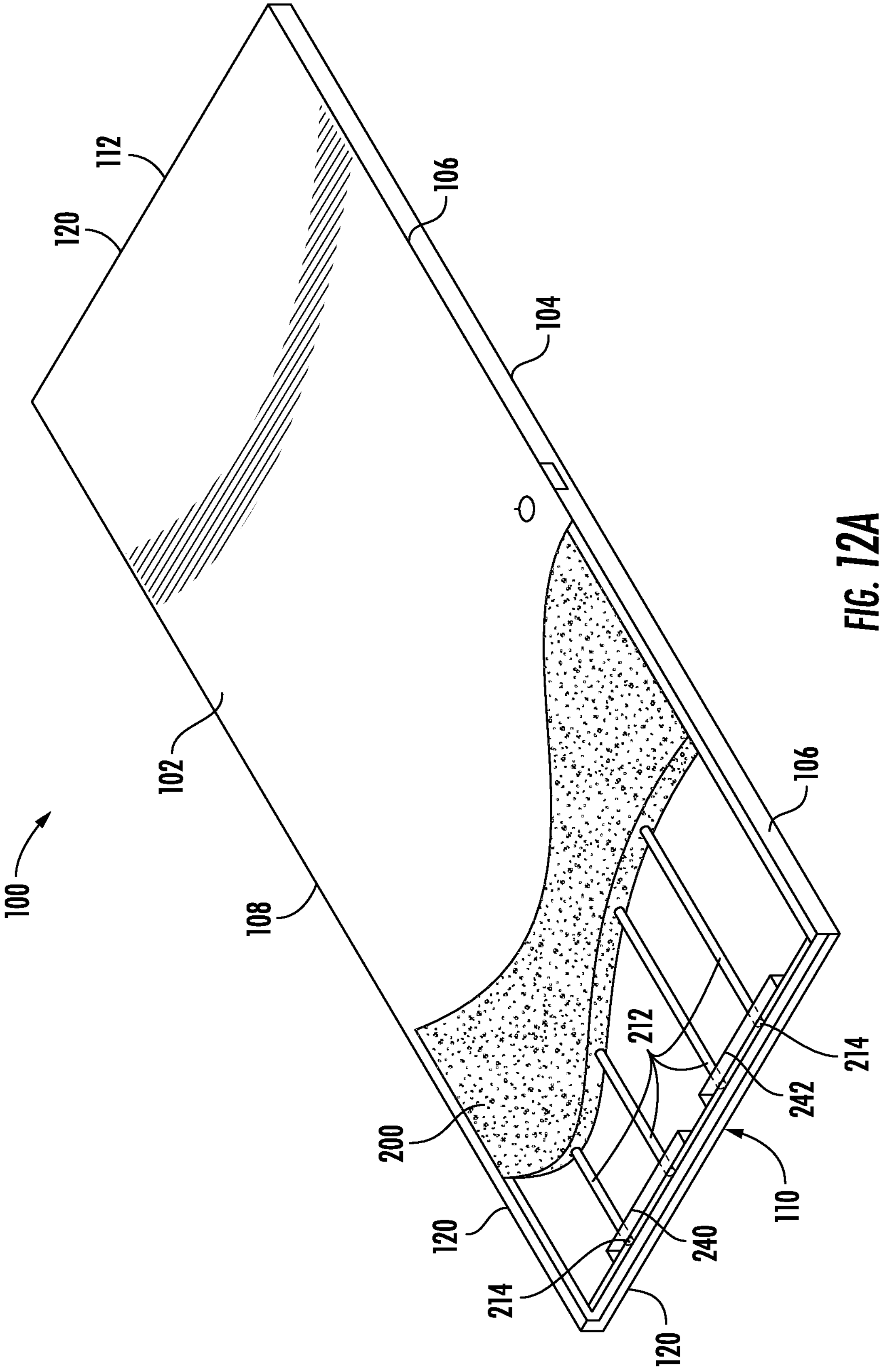

FIG. 12A illustrates a perspective view of a barrier that utilizes a plurality of stiffeners that are supported by end cap that may be attached to the end members, in accordance with some embodiments of the present disclosure.

Figure 12B:
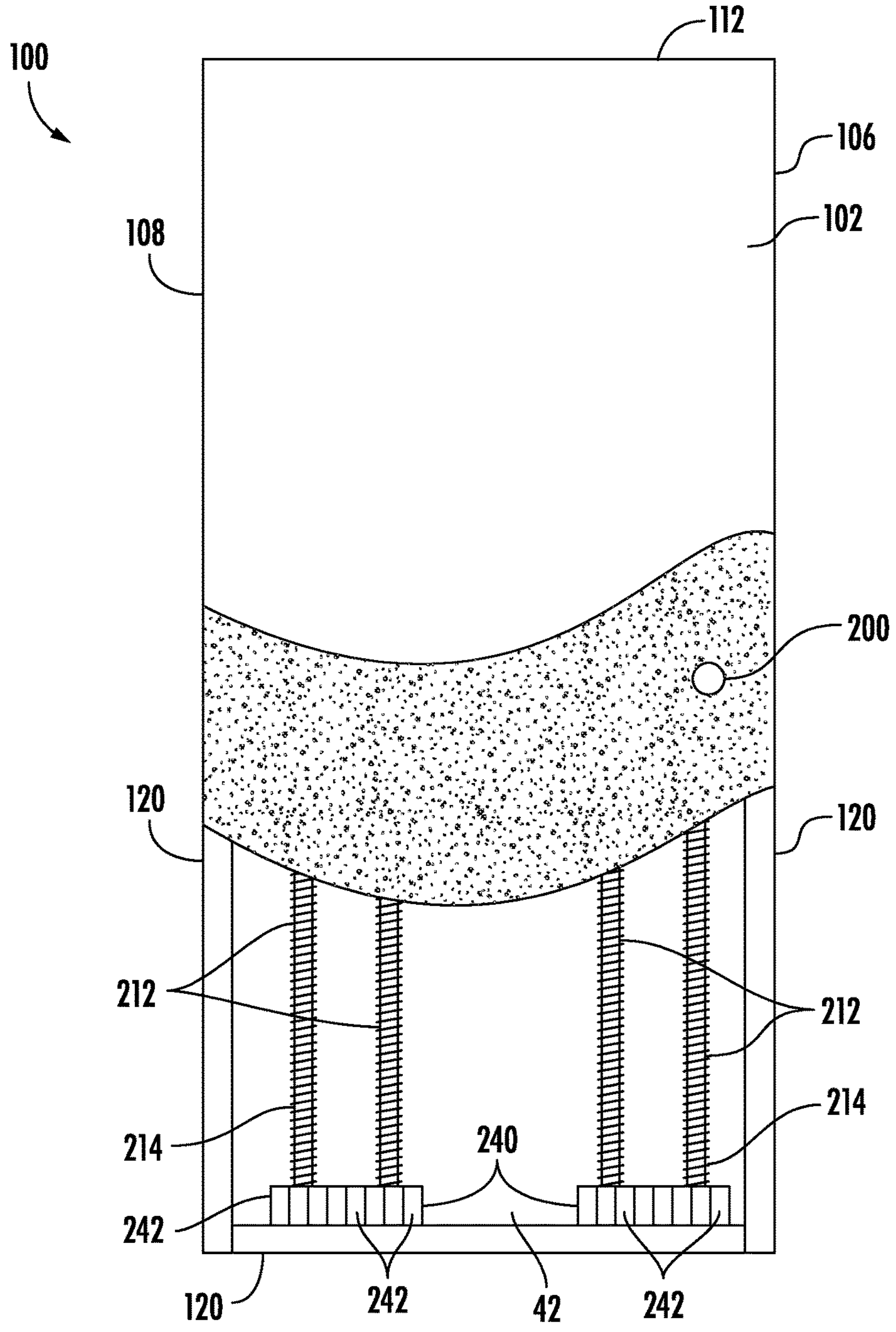

FIG. 12B illustrates a front cut-away view of the barrier of FIG. 12A, in accordance with some embodiments of the present disclosure.

Figure 12C:
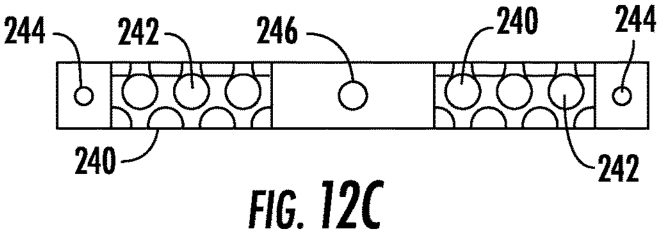

FIG. 12C illustrates cross-sectional view of the barrier of FIG. 12B, in accordance with some embodiments of the present disclosure.

Figure 12D:
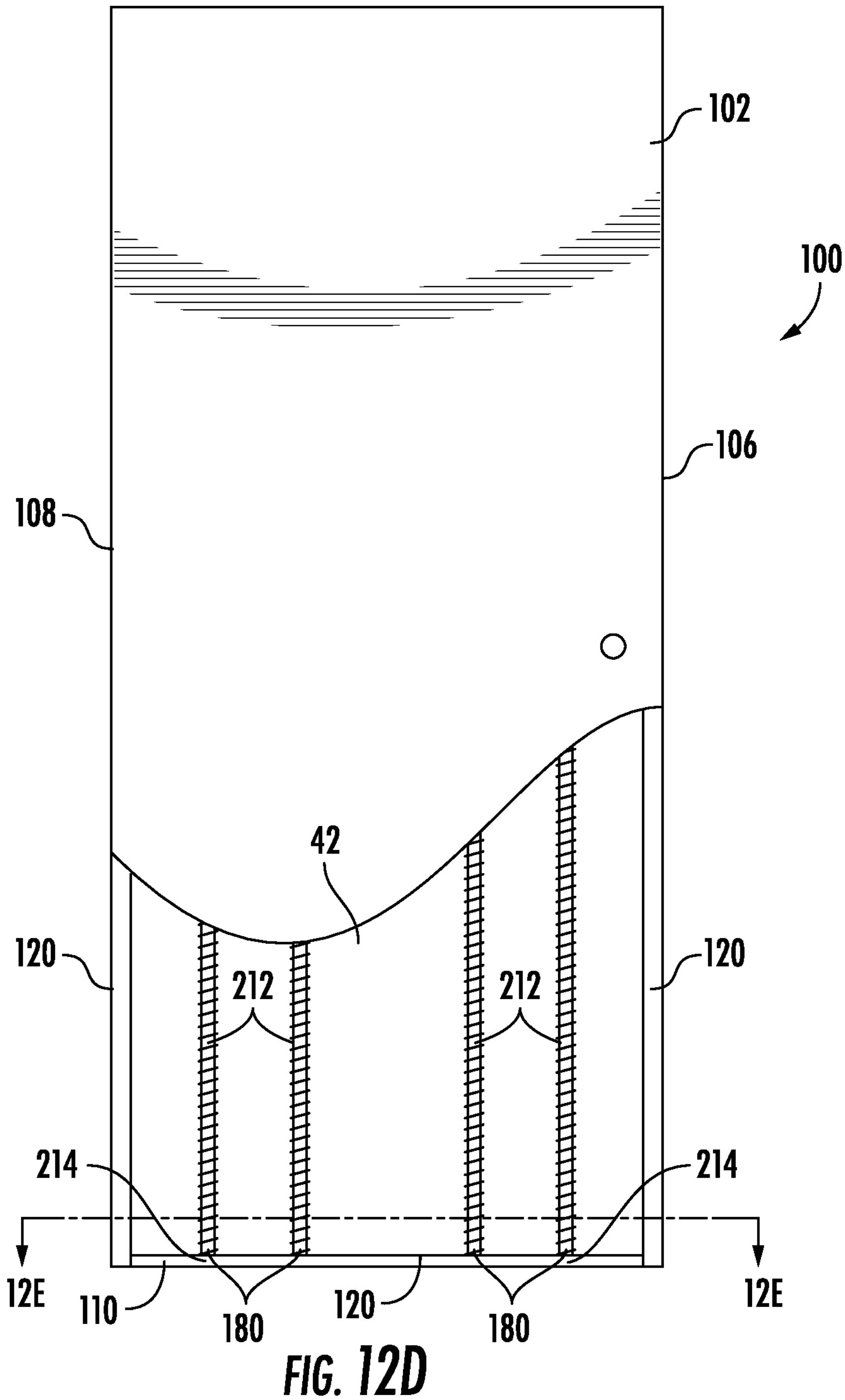

FIG. 12D illustrates a front cut-away view of an alternate connection for the plurality of stiffeners using the end members, in accordance with some embodiments of the present disclosure.

Figure 12E:
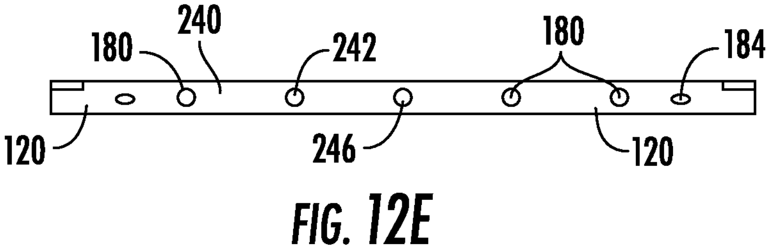

FIG. 12E illustrates a cross-sectional view of the barrier of FIG. 12D, in accordance with some embodiments of the present disclosure.

Figure 13A:
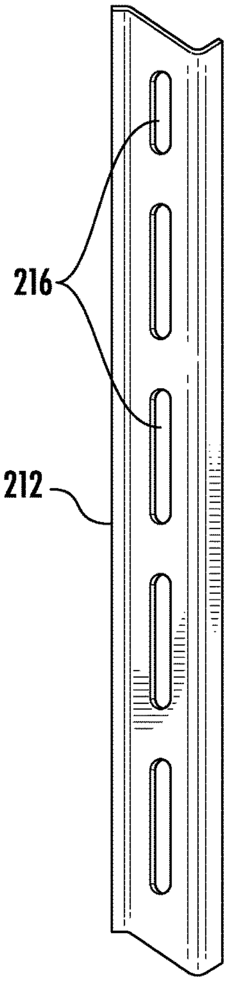

FIG. 13A illustrates a perspective view of a z-shaped stiffener, in accordance with some embodiments of the present disclosure.

Figure 13B:
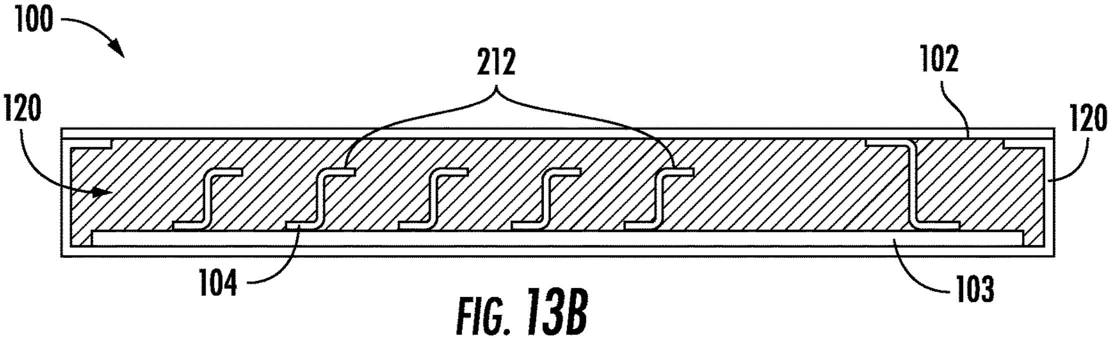

FIG. 13B illustrates a cross-section view of a barrier that uses a plurality of z-shaped stiffeners with a liner, in accordance with some embodiments of the present disclosure.

Figure 13C:
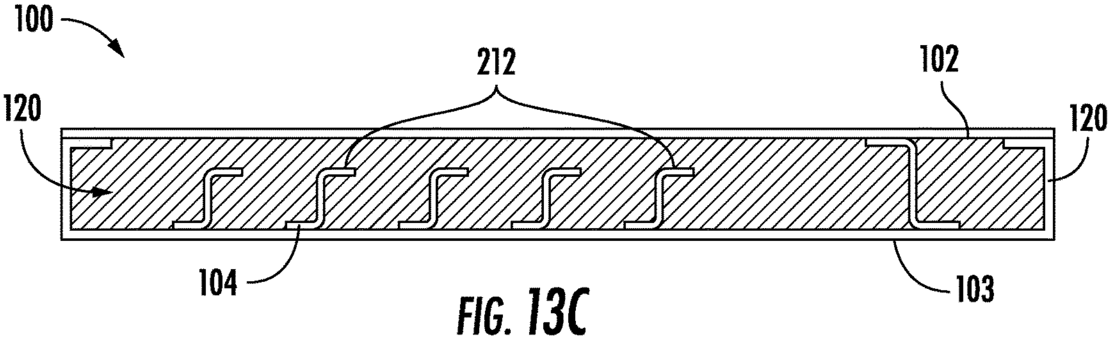

FIG. 13C illustrates a cross-section view of a barrier that uses a plurality of z-shaped stiffeners without a liner, in accordance with some embodiments of the present disclosure.

Figure 14A:
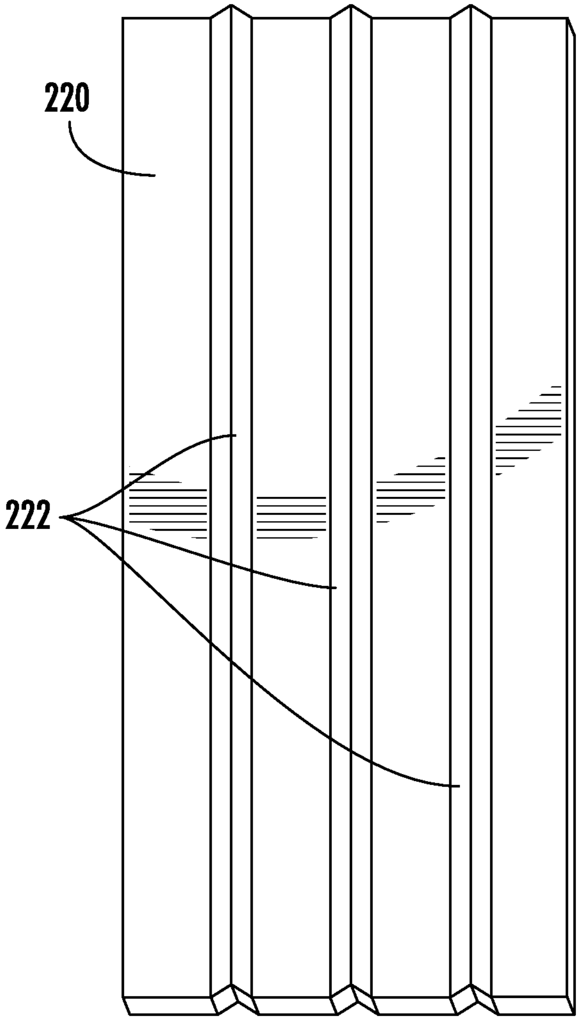

FIG. 14A illustrates a perspective front view of a stiffener layer formed as a panel, in accordance with some embodiments of the present disclosure.

Figure 14B:
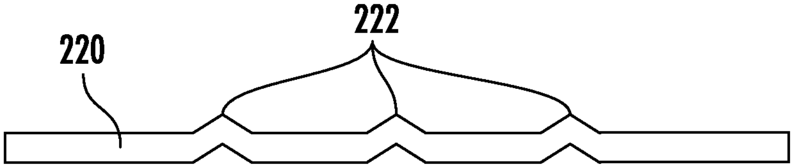

FIG. 14B illustrates a cross-section view of the stiffener layer of FIG. 14A, in accordance with some embodiments of the present disclosure.

Figure 14C:
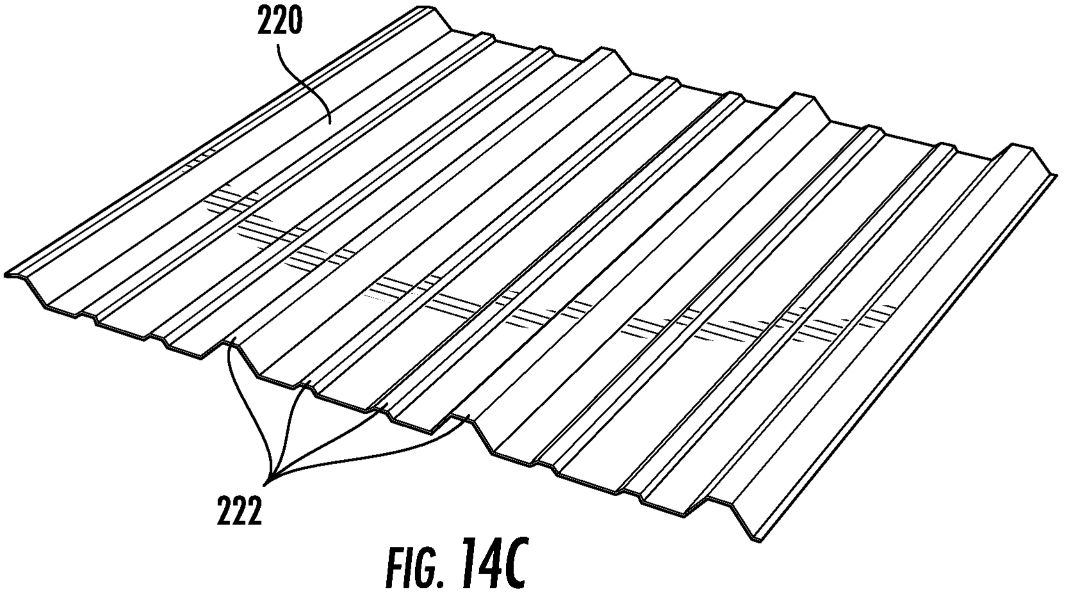

FIG. 14C illustrates a perspective front view of a stiffener layer formed as a panel, in accordance with some embodiments of the present disclosure.

Figure 14D:
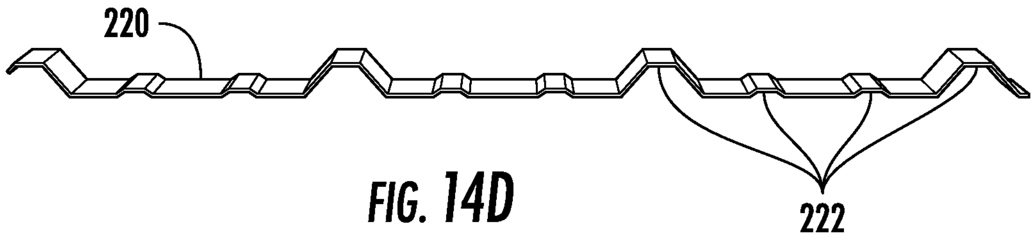

FIG. 14D illustrates an end view of the stiffener layer of FIG. 14C, in accordance with some embodiments of the present disclosure.

Figure 14E:
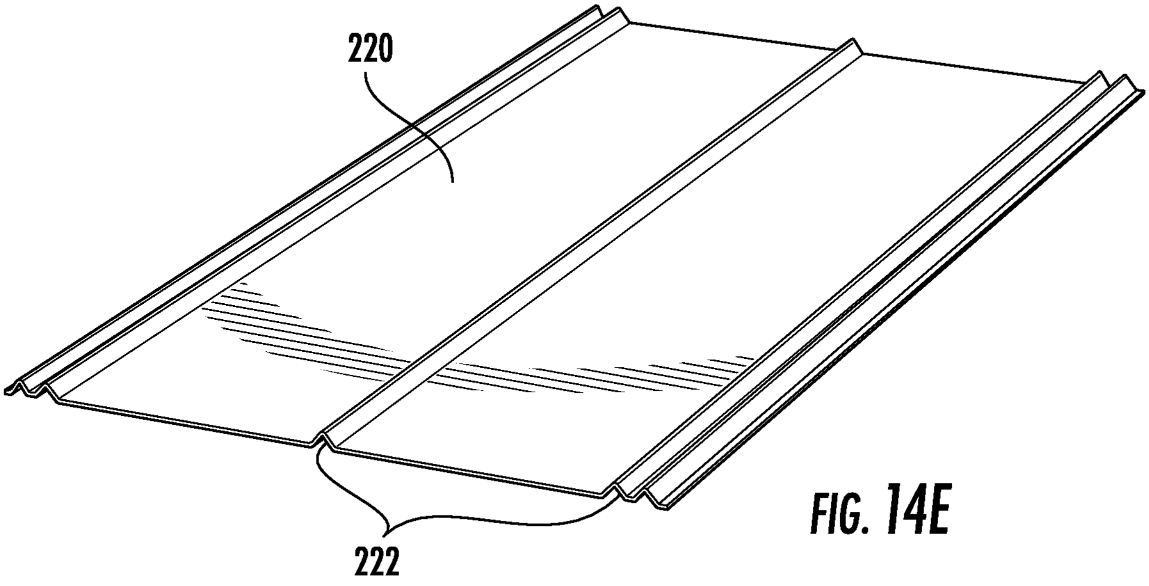

FIG. 14E illustrates a perspective front view of a stiffener layer formed as a panel, in accordance with some embodiments of the present disclosure.

Figure 15A:
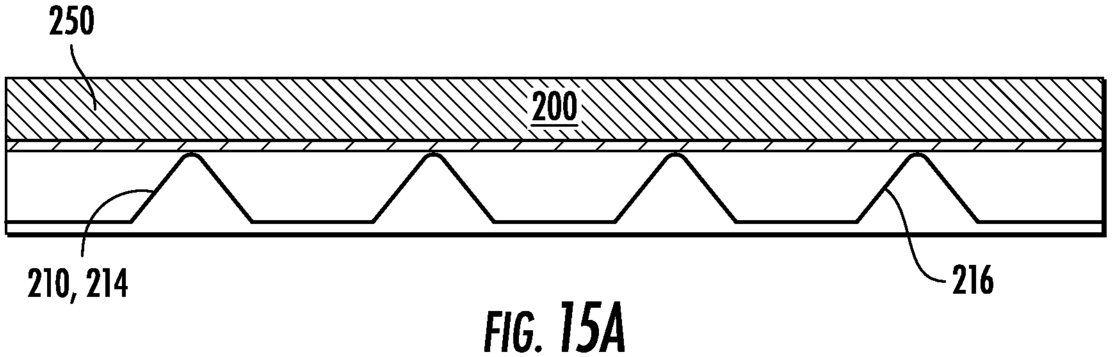

FIG. 15A illustrates a cross-sectional view of a core having a solid layer and a stiffener layer, in accordance with some embodiments of the disclosure.

Figure 15B:
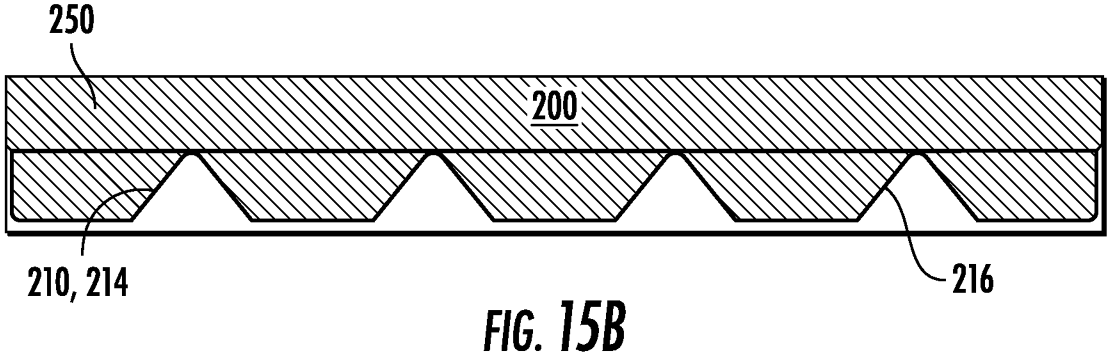

FIG. 15B illustrates a cross-sectional view of a core having a solid layer and a stiffener layer with the solid layer extending between the ribs of the stiffener layer, in accordance with some embodiments of the disclosure.

Figure 15C:
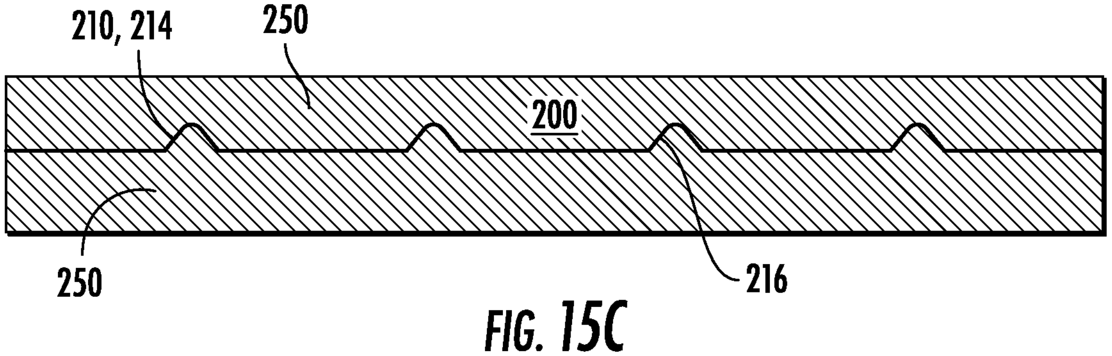

FIG. 15C illustrates a cross-sectional view of a core having a stiffener layer located between two solid layers or within a solid layer, in accordance with some embodiments of the disclosure.

Figure 15D:
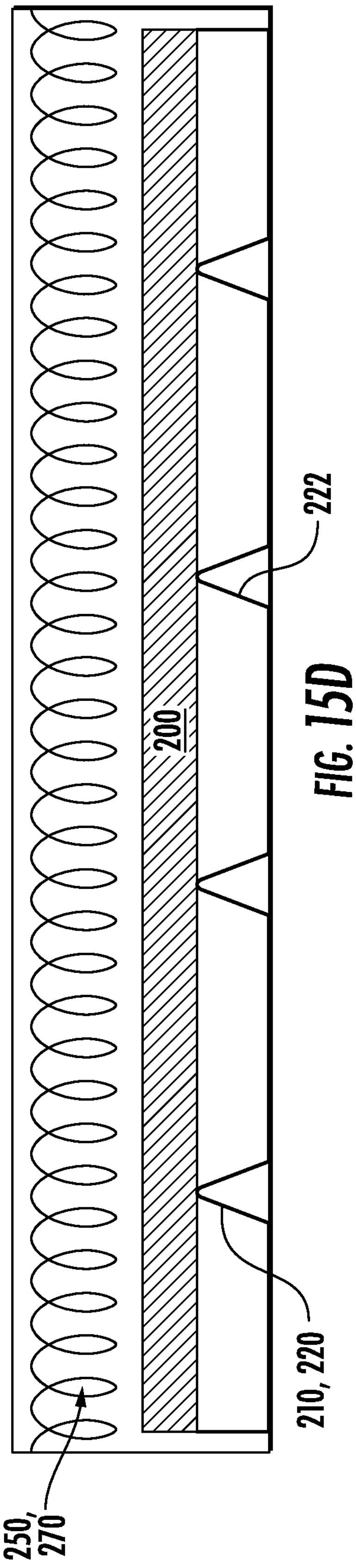

FIG. 15D illustrates a cross-sectional view of a core having two solid layers, and a stiffener layer, in accordance with some embodiments of the disclosure.

Figure 15E:
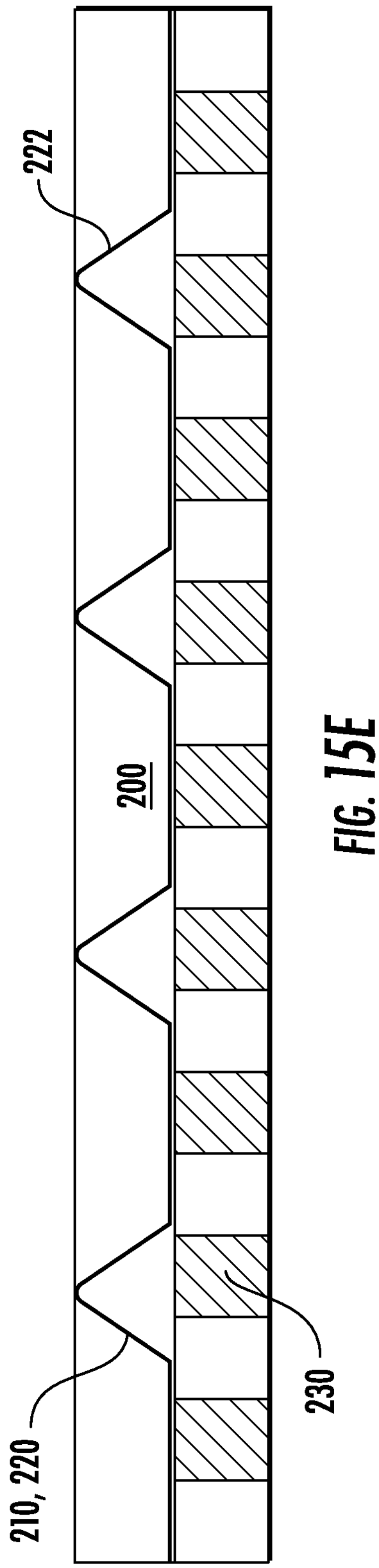

FIG. 15E illustrates a cross-sectional view of a core having a stiffener layer and a matrix layer, in accordance with some embodiments of the disclosure.

Figure 15F:
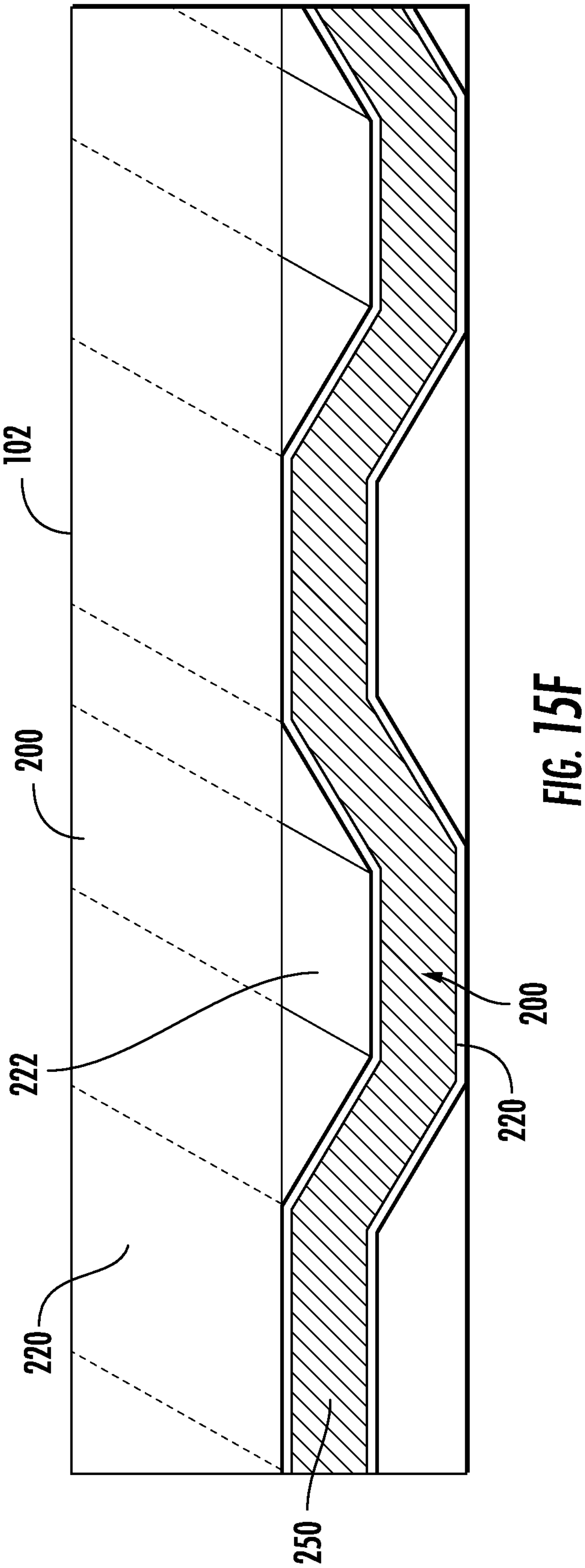

FIG. 15F illustrates a perspective view of a core having two stiffener layers operatively coupled around a solid layer, in accordance with some embodiments of the disclosure.

Figure 15G:
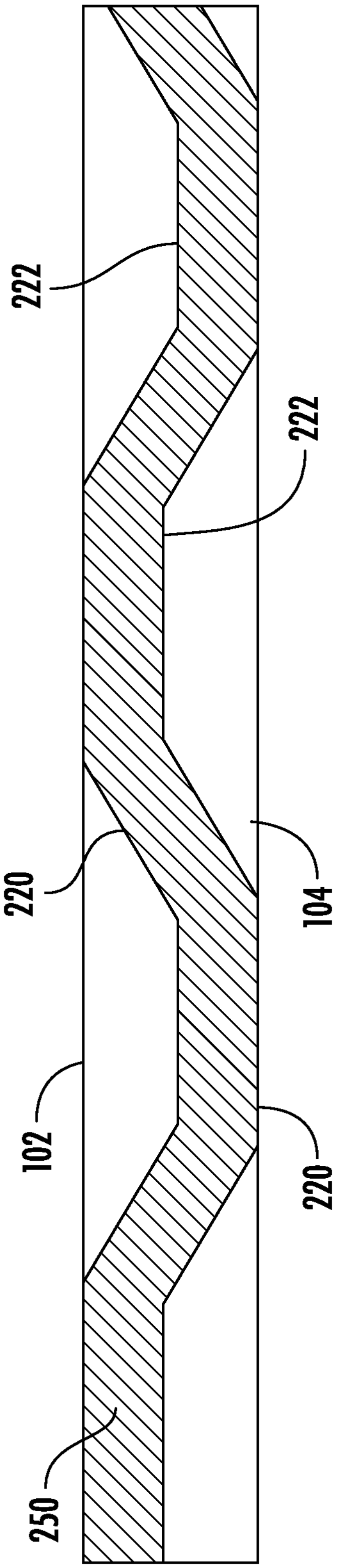

FIG. 15G illustrates a cross-sectional view of the barrier of FIG. 15F, in accordance with some embodiments of the disclosure.

Figure 15H:
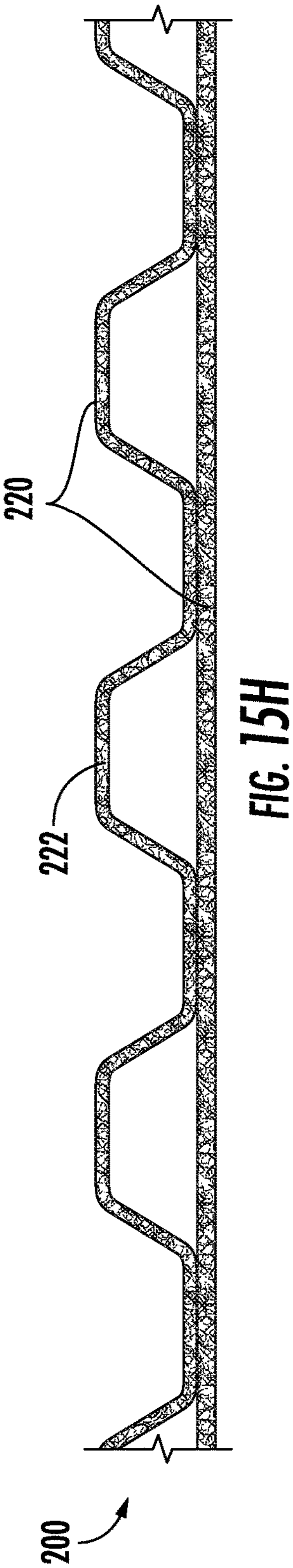

FIG. 15H illustrates a cross-sectional view of the core having one or more stiffener layers formed from alternate materials and having a stiffener panel and liner, in accordance with some embodiments of the disclosure.

Figure 15I:
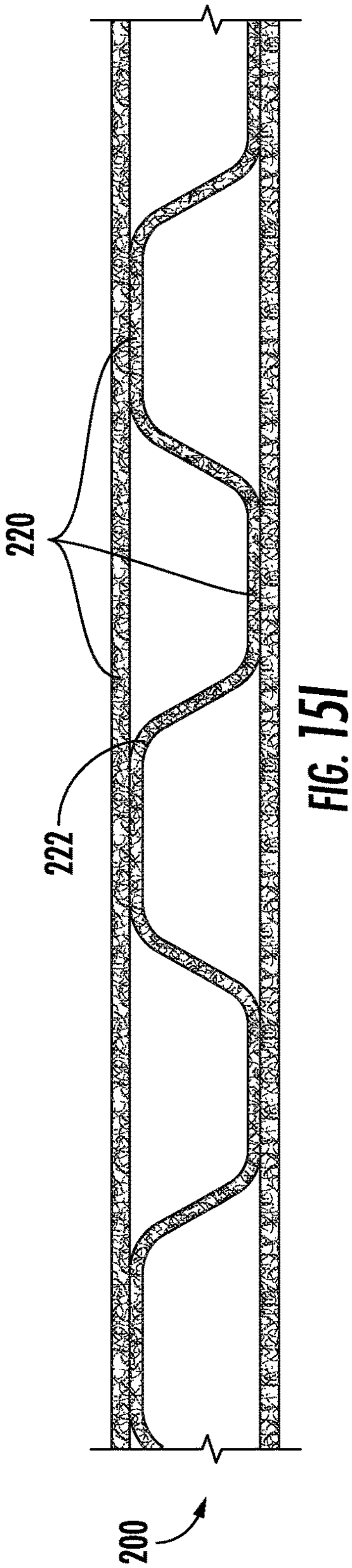

FIG. 15I illustrates a cross-sectional view of the core having one or more stiffener layers formed from alternate materials and having a stiffener panel between two liners, in accordance with some embodiments of the disclosure.

Figure 15J:
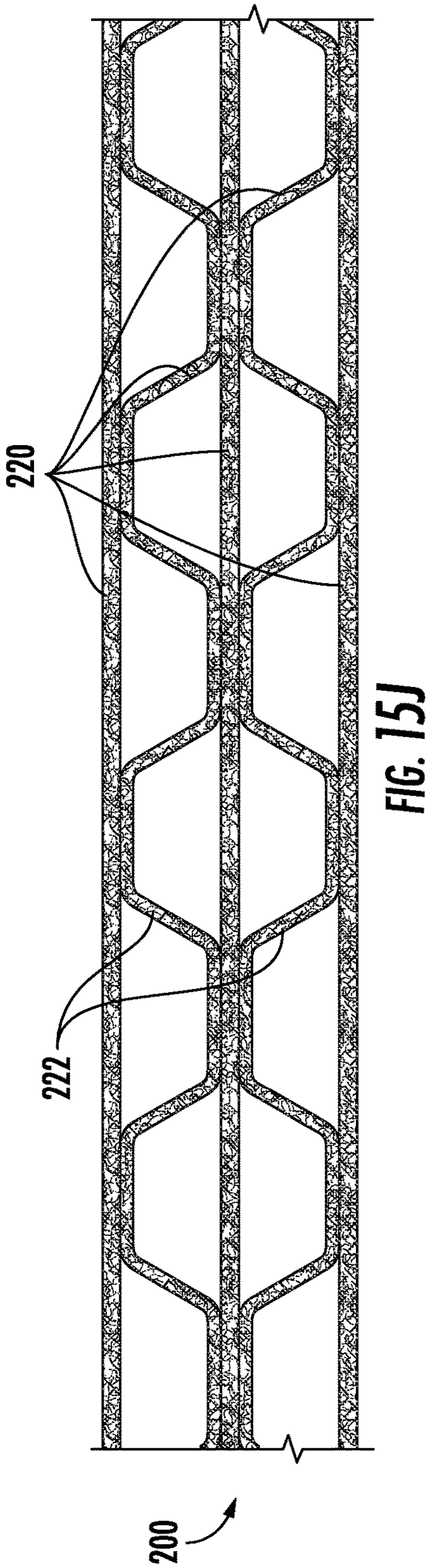

FIG. 15J illustrates a cross-sectional view of the core having one or more stiffener layers formed from alternate materials and having two stiffener panels between three liners, in accordance with some embodiments of the disclosure.

Figure 16A:
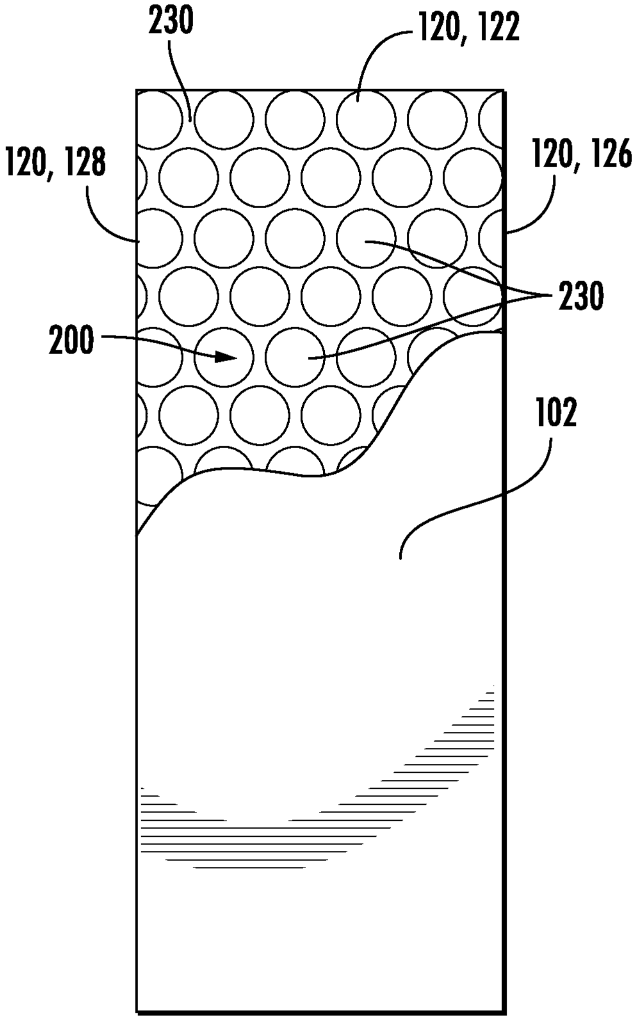

FIG. 16A is front view of a door assembly with a front face partially removed that utilizes a core having a matrix layer, in accordance with some embodiments of the disclosure.

Figure 16B:
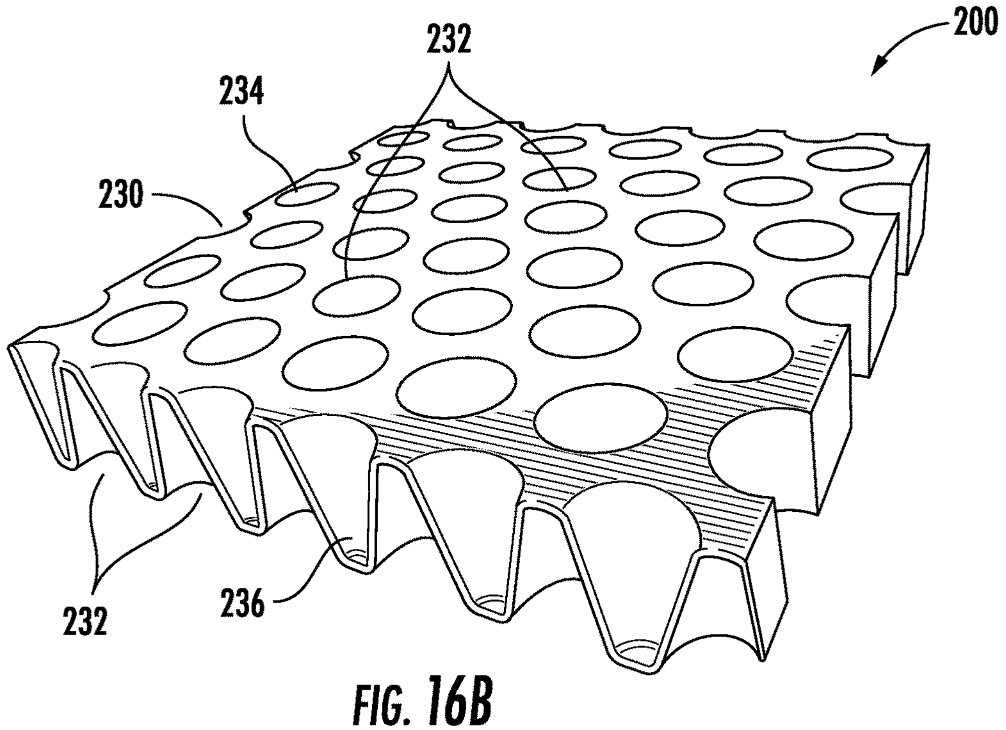

FIG. 16B illustrates a portion of matrix layer for a core, in accordance with some embodiments of the disclosure.

Figure 16C:
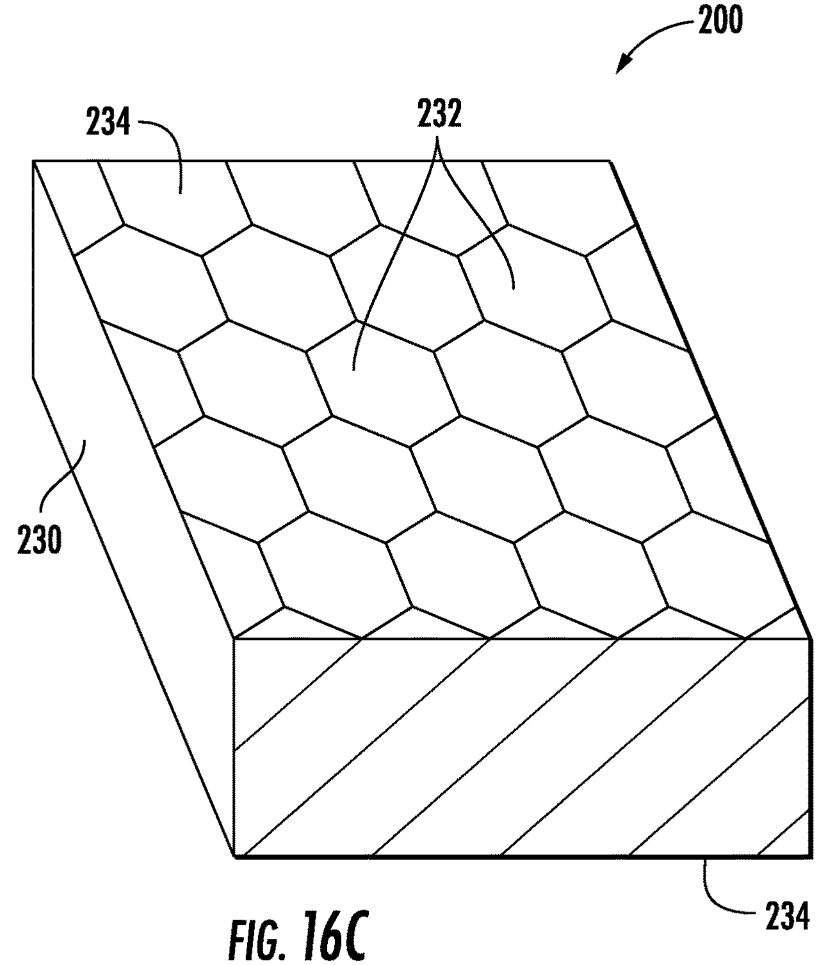

FIG. 16C illustrates a portion of matrix layer for a core, in accordance with some embodiments of the disclosure.

Figure 17A:
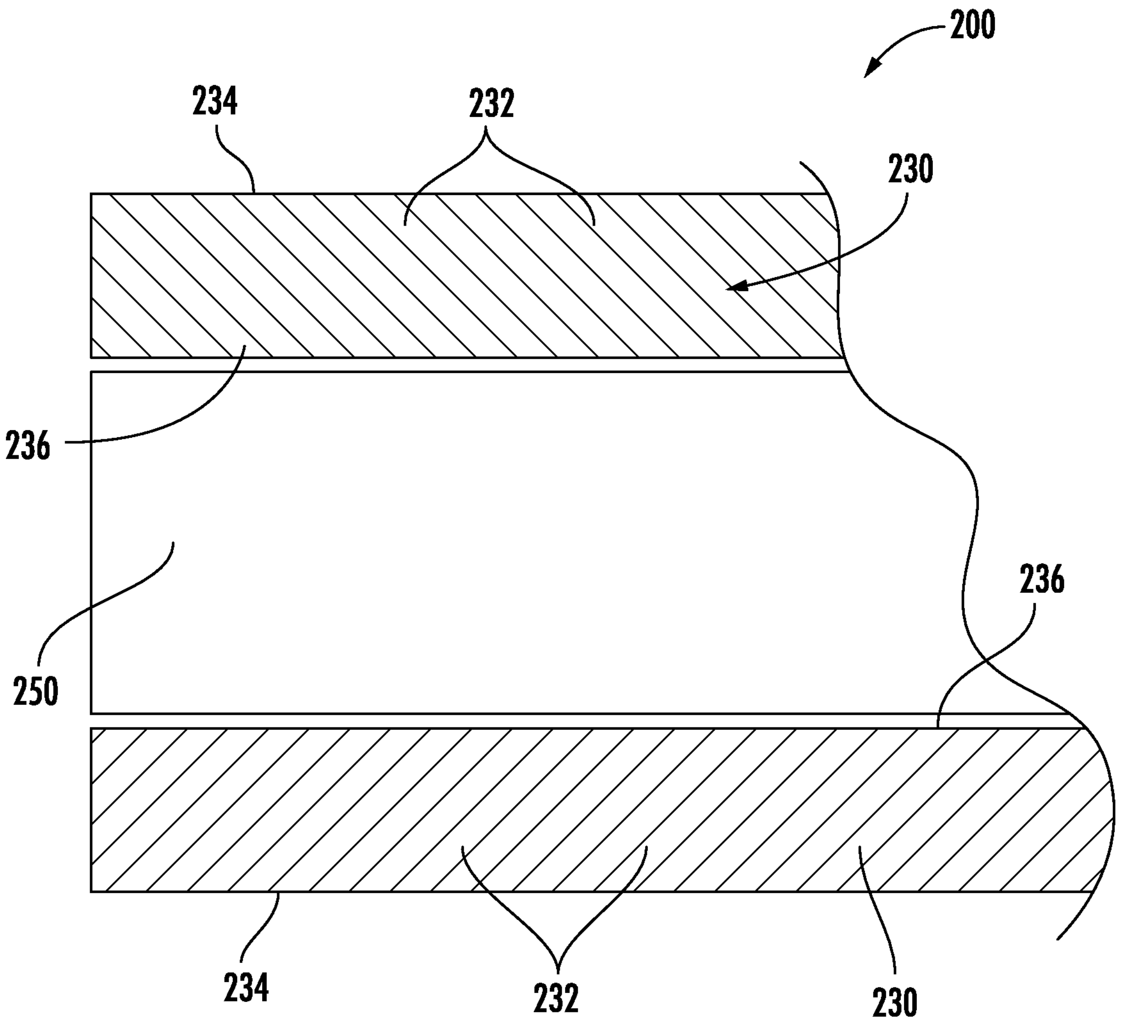

FIG. 17A illustrates a portion of a core with a solid layer located between two matrix layers that have apertures located in two different orientations, in accordance with some embodiments of the disclosure.

Figure 17B:
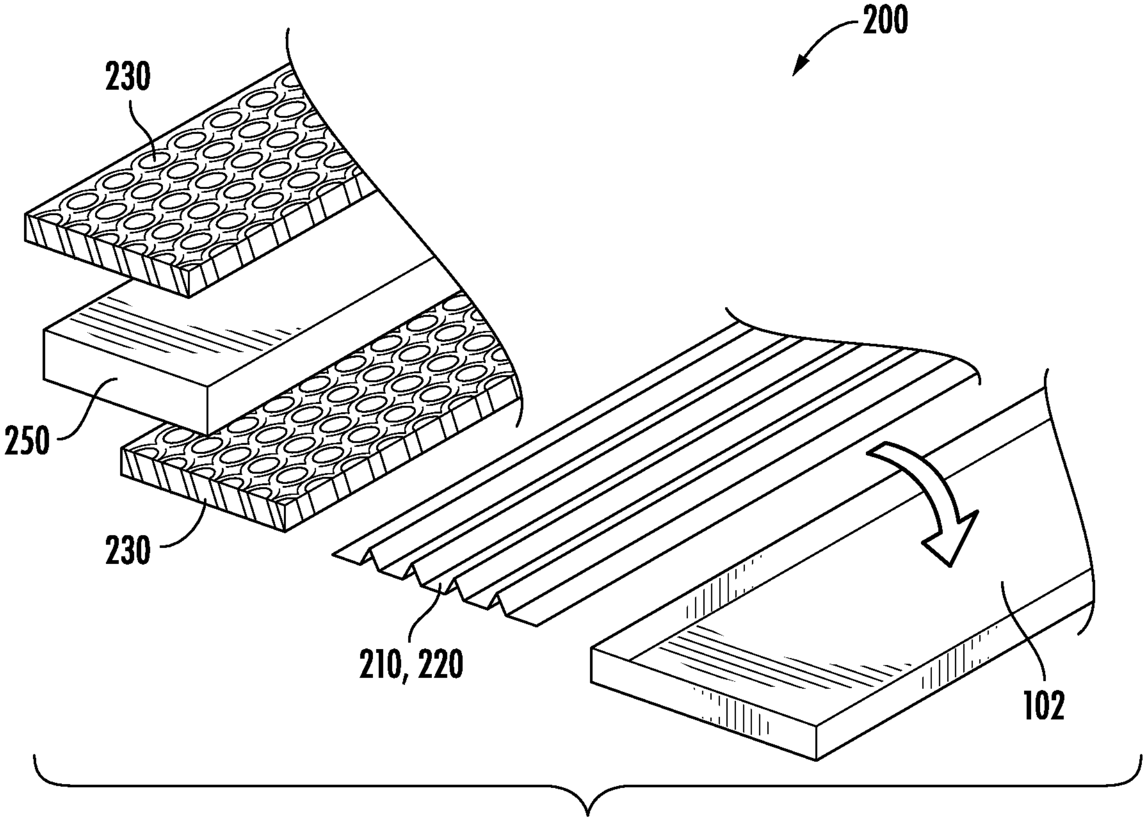

FIG. 17B illustrates an exploded view of two matrix layers, a solid layer, and a stiffener layer of core and a portion of a door formed from edge members and a door face, in accordance with some embodiments of the disclosure.

Figure 17C:
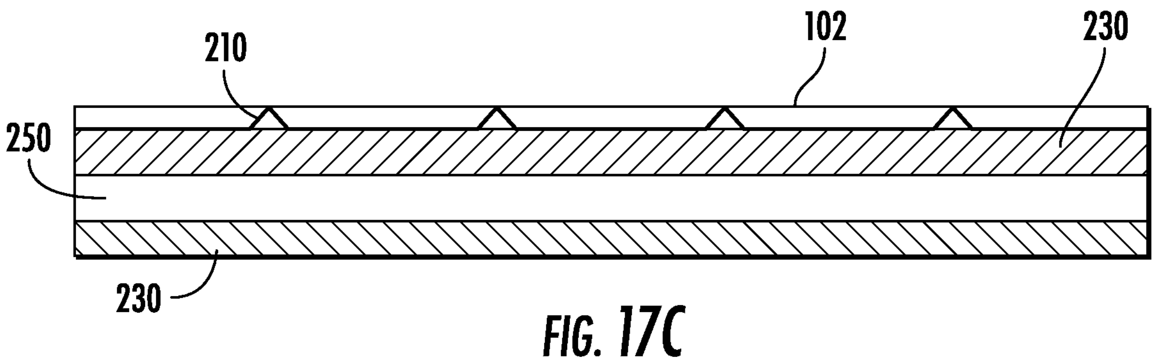

FIG. 17C illustrates a cross-sectional view the core of FIG. 17B with the layers stacked, in accordance with some embodiments of the disclosure.

Figure 18A:
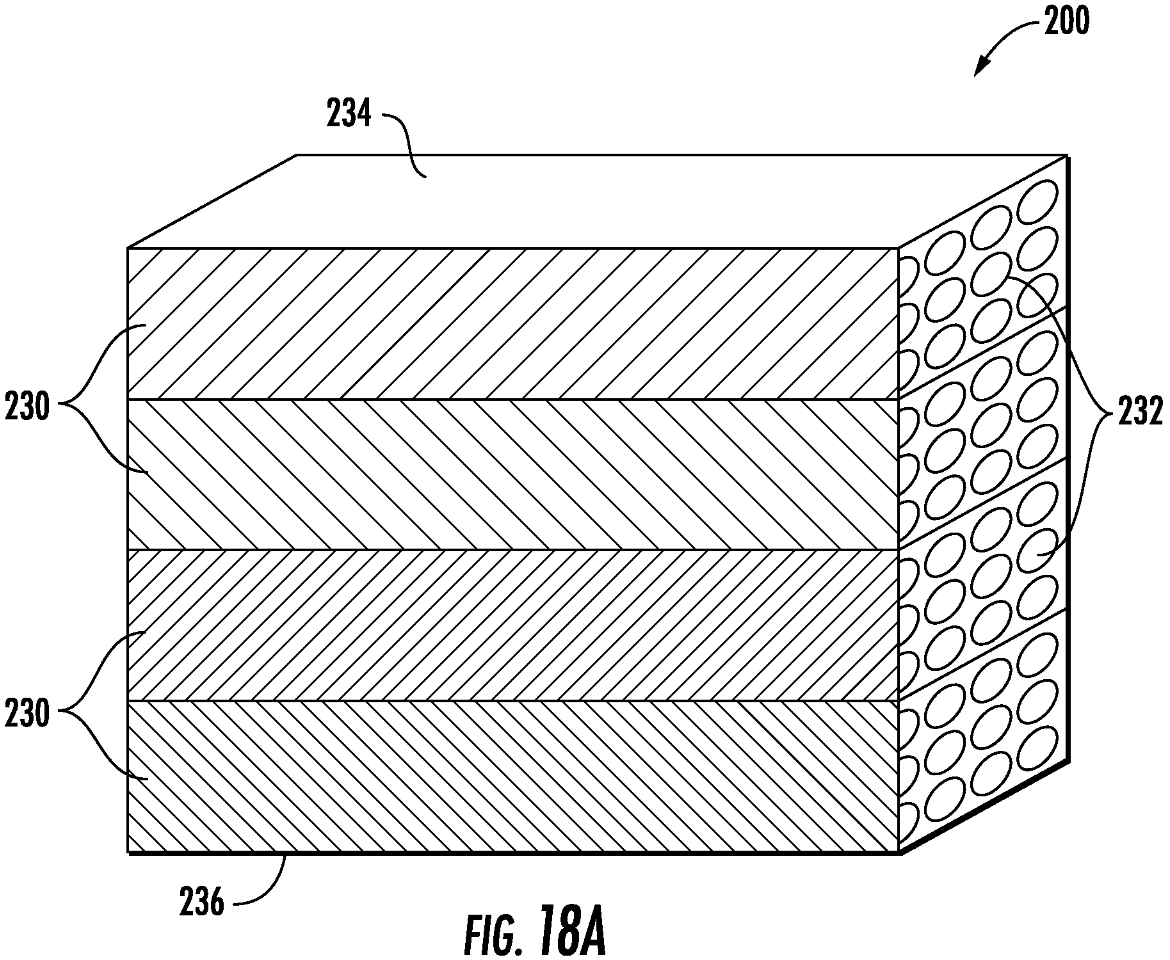

FIG. 18A illustrates a cross-sectional perspective view of a core having four matrix layers, in accordance with some embodiments of the disclosure.

Figure 18B:
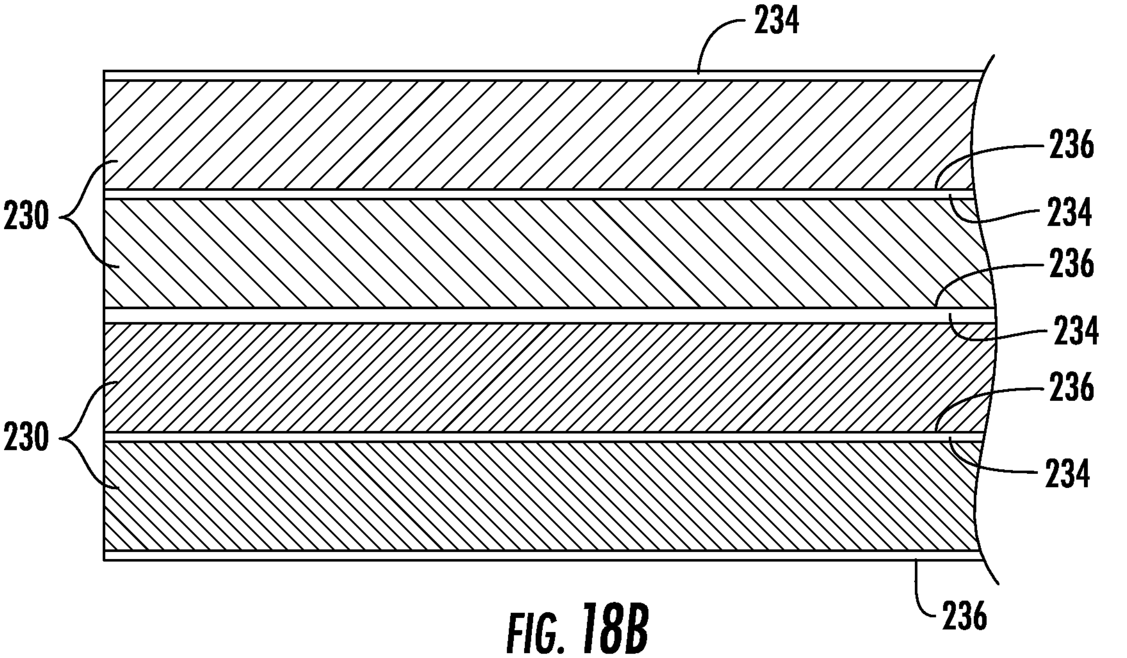

FIG. 18B illustrates a cross-sectional side view of the core of FIG. 18A having four matrix layers, in accordance with some embodiments of the disclosure.

Figure 19:
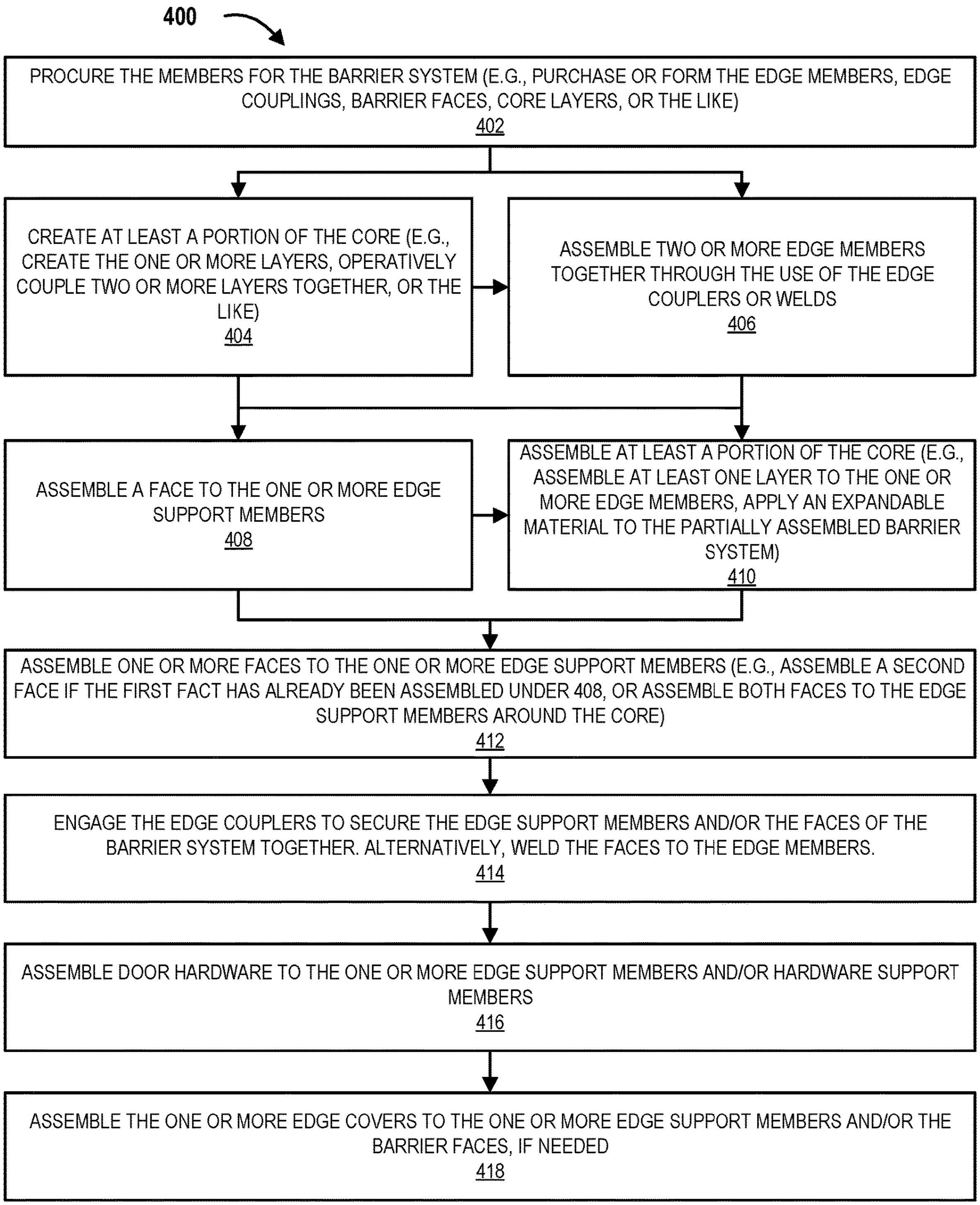

FIG. 19 is a process flow for assembling a door, in accordance with some embodiments of the disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms “a”, “an” and “the” are intended to include the plural forms as well, unless the context clearly indicates otherwise. Moreover, when utilizing “and”, “or”, or “and/or” in the specification, it should be understood that these terms indicate that single recitations in the list may be used or combinations of the recitations in the list may be used together. It will be further understood that the terms “includes” and/or “including” when used herein, specify the presence of stated features, steps, operations, elements, and/or components, but do not preclude the presence or addition of one or more other features, steps, operations, elements, components, and/or groups thereof.

The present disclosure relates to a barrier 100, which is illustrated in the figures as a door. However, it should be understood that the components may be used in any type of barrier, such as a wall, a partition, a window barrier, or the like. As illustrated in FIGS. 1 through 4, the barrier 100 may comprise a first face 102 (e.g., a front face), a second face 104 (e.g., a rear face), a first edge 106 (e.g., a right edge), a second edge 108 (e.g., left edge 108), a bottom edge (e.g., a lower edge—not illustrated), and/or a top edge 112 (e.g., an upper edge).

As will be described in further detail here, the barrier 100 may be formed through the use of traditional welding operations; however, in other embodiments, the barrier 100 may be assembled through the use of mechanical assembly with reduced welding (e.g., limited or no welding). As illustrated in FIGS. 1 through 4, the edges of the barrier system 100 may be formed through the use of edge support members 120, such as a top edge support member 122 (e.g., header edge support member), a bottom edge support member (e.g., bottom rail—not illustrated), a first edge support member 126 (e.g., a lock edge support member, or the like), and a second edge support member 128 (e.g., a hinge edge support member, or the like). While the lock edge and/or hinge edge support members may be illustrated on the vertical edges of the barrier system 100, it should be understood that in some barriers 100 the lock edge and/or hinge edge support members (or other edges described herein) may be used as the top edge and/or bottom edge support members. The top edge support member 122 may include a reinforcement (e.g., plate, block, insert, or the like) that provides reinforcement to a door closer/opener or other types of barrier hardware. The first edge support member 126 may include a reinforcement for locking mechanisms (e.g., mortis lock, deadbolt lock, cam lock, electronic lock, smart lock, or the like). The second edge support member 128 may include reinforcements for hinges (e.g., butt hinge, barrel hinge, spring loaded hinge, concealed hinge, overlay hinge, offset hinge, continuous hinge, geared hinge, or the like).

Moreover, as will be described in further detail herein, one or more edge covers 170 may be operatively coupled to the edge support members 120 and/or the faces 102, 104 in order to cover the edge couplings 10 used to operatively couple the edge support members 120 and/or to provide the aesthetics of the barrier 100. For example, the faces 102, 104 and/or the covers 170 may be steel, aluminum, or other type of metal. However, in order to reduce the amount of steel utilized within the barrier 100, the faces 102, 104, the edge members 120, and/or the covers 170 may be made of wood, plastic, composite, glass, or other material, which may be coated (e.g., with a paint or other liquid, with a laminate, with an adhesive decal, or the like), etched (e.g., using a laser, mechanical etching, or the like) in order to provide the desired aesthetics (e.g., marketing material, decorative façade, branding, or the like). In some embodiments, the edge support members 120 with the outer cavity 138 (as will be described in further detail herein), and the removeable edge covers allows for ease of retrofitting of the barrier 100 after installation (e.g., adding or removing reinforcements for different barrier hardware configurations).

The edge support members 120, as illustrated in the figures, may be H-shaped support members. However, it should be understood that the edge support members 120 may have any type of shape (e.g., I-shaped, c-shaped, u-shaped, z-shaped, other uniform, or non-uniform shape) that can be used to provide structure to the barrier 100, allow for the assembly of the edge members 120 together using the edge couplers 10, provide locations to support different typed of barrier cores 200, allow for the attachment of the barrier faces 102, 104, and/or provide location for attachment of barrier hardware (e.g., openers, closers, hinges, locking components, handles, or the like), or provide other like benefits. Moreover, as will be described in further detail herein, the components of the barrier 100 may allow for the reduction in the amount of steel used in barriers, as well as reducing or eliminated welding, while providing improved properties of traditional barriers that utilize steel. Moreover, it should be understood that the barrier faces 102, 104 may have one or more bends such that the barrier faces 102, 104 may form at least a part of the edge member 120. That is, for example, a door face 102, 104 may have edges that are bent in order to integrally form the first edge support member 126 (e.g., a lock edge support member, or the like), the second edge support member 128 (e.g., a hinge edge support member, or the like), and/or the covers 170 for the foregoing. Additionally, or alternatively, the barrier faces 102, 104 may form at least a part of the top edge support member 122 (e.g., header edge support member), a bottom edge support member (e.g., bottom rail—not illustrated), and/or the covers 170 for the foregoing. Regardless of the configuration, the barrier faces 102, 104 and/or the edge members 120 may form a shell in which the cores may be created and/or formed in place or dropped into the barrier shell as a pre-assembled cores. For example, dropped in from an open face before one of the barrier faces 102, 104 are assembled, and/or dropped in from an open edge before an edge member 120 is assembled. Additionally, or alternatively, the core 200 may be formed by inserting material (e.g., expanding material) in an opening in a barrier face 102, 104 and/or edge member 120.

As illustrated in FIGS. 1 through 7B, the edge support members 120 may have a first flange 132, a second flange 134, and a web 136 operatively coupling the first flange 132 and the second flange 134. The first flange 132 and the second flange 134 may extend in one direction from the web 136 (e.g., generally perpendicular creating a c-shaped or u-shaped member as illustrated in FIG. 5), or the first flange 132 and the second flange 134 may extend in two directions from the web 136 (e.g., generally perpendicular forming the H-shaped or I-shaped member as illustrated in FIG. 6). As such, in some embodiments the flanges 132, 134 and webs 136 of the edge support members 120 may form an outer cavity 138 and/or an inner cavity 139. In some embodiments, the outer cavity 138 may be at least partially closed though the use of an edge support top flange 140 (e.g., with one or more coupling apertures 142 to allow for access to edge couplers 10). As will be described in further detail herein, the inner cavity 139 may be utilized for operative coupling with a core 200, while the outer cavity 138 may be utilized to allow for the assembly of the edge couplers 10. Additionally, or alternatively, in some embodiments, the inner cavity 139 may be utilized to allow for the assembly of the edge couplers 10.

As illustrated in FIGS. 1 through 4 and 7A through 8, edge couplers 10 may be utilized in order to operatively couple the edge support members 120 together. For example, in some embodiments the edge couplers 10 may comprise of one or more tie members 20 and one or more bearing members 30. In some embodiments, the tie member 20 may be any type of elongated member, such as a rod of any shape (e.g., circular, oval, square, rectangular, pentagonal, hexagonal, heptagonal, octagonal, any polygonal, uniform, or non-uniform shape), being solid, hollow, or partially hollow, being at least partially threaded in some embodiments, or the like. The one or more bearing members 30 may be any type of bearing member 30, such as a wedge member (e.g., triangular member, or the like), a bracket member (e.g., an L-shaped bracket, plate bracket, u-shaped bracket, V-shaped, c-shaped bracket, s-shaped bracket, or the like), or the like member. As will be described in further detail below, one or more tie members 20 and one or more bearing members 30 may be used to operatively couple at least two edge members 120 (e.g., adjacent edge members and/or opposing edge members) of a barrier system 100. In some embodiments, fasteners 40 (e.g., nuts, screws, bolts, or the like) may be used to operatively couple the one or more tie members 20 and the one or more bearing members 30.

In some embodiments, the tie member 20 may be an elongated tie member 20 that extends at least a portion of the length of an edge support member 120. For example, the tie member 20 may have a first tie member end 22 and a second tie member end 24. In some embodiments the first tie member end 22 may extend past at least a portion of an end of an edge support member 120, while the second tie member end 24 may be operatively coupled to the body of an edge support member 120 (e.g., to a coupling attached an edge support member 120, such as a fastener coupled to the H-shaped edge support member). In this way, a bearing member 30 (as will be described in further detail herein) may be used to operatively couple a first edge member 120 to an adjacent second edge member 120. For example, a top edge support member 122 may be operatively coupled to a first edge support member 126 by operatively coupling the second tie member end 24 of the tie member 20 to the top edge support member 122; and operatively coupling the first tie member end 22 to a first edge support member 124 through the use of a bearing member 30 and a fastener 40 that may be engaged such that the tie member 20, the beaning member 30, and/or the fastener 40 pulls the ends of the adjacent edge support members 120 together.

In other embodiments, the tie member 20 may extend across two ends of two adjacent edge members 120 and may be operatively coupled to two bearing members 30. The first tie member end 22 may extend past at least a portion of an end of an edge support member 120, while the second tie member end 24 may extend past at least a portion of an end of an adjacent edge support member 120. Each end may be operatively coupled to a bearing member 30, and one or more fasteners 40 may be engaged to pull the ends of the adjacent end support members together. For example, a top edge support member 122 may be operatively coupled to a first edge support member 126 by operatively coupling the first tie member end 22 to a first edge support member 124 through the use of a first bearing member 30 and/or a first fastener 40; operatively coupling the second tie member end 24 of the tie member 20 to an adjacent end of the top edge support member 122 through the use of a second bearing member 30 and/or second fastener 40; and engaging the tie member 20, the two beaning members 30, and/or the fasteners 40 to pull the ends of the adjacent edge support members 120 together.

In other embodiments, the tie member 20 may be an elongated tie member 20 that extends the length of an edge member 120. For example, the tie member 20 may have a first tie member end 22 and a second tie member end 24 both of which extend past the ends of an edge support member 120. In this way, a bearing member operatively coupled to each end 22, 24 of the tie member 20 may be utilized to operatively couple the edge member 120 to two adjacent edge members 120. For example, a top edge support member 122 may be operatively coupled to a first edge support member 126 and a second edge support member 128 by operatively coupling the first tie member end 22 to a first edge support member 126 through the use of a first bearing member 30 and/or a fastener 40 that may be engaged, and by operatively coupling the second tie member end 24 to a second edge support member 128 through the use of a second bearing member 30 and/or a fastener 40 that may be engaged. When the tie member 20, the first bearing member 30, the second bearing member 30, and/or the one or more fasteners 40 are engaged, a first end of the top edge support member 122 and an end of the first edge support member 126, as well as a second edge of the top edge support member 122 and an end of the second end support member 128 are pulled together.

In other embodiments, one or more tie members 20 may extend between opposing edge support members (e.g., between the top edge support member 122 and the bottom edge support member 124 and/or the first edge support member 126 and the second edge support member 128) and one or more bearing members 30 (e.g., through the core) and/or one or more fasteners 40 may be used to pull the opposing edge support members together such that adjacent edge support members 30 bear against the ends of the opposing edge support members. In some embodiments, the one or more tie members 20 may extend through a core 20 (e.g., pre-assembled core or a formed in place core) and used to secure the edge members 120 and/or the faces 102, 104 of the barrier together.

In other embodiments of the invention other types of edge couplers 10 may be utilized to operatively couple edge support members 120 together. As will be described in some embodiments of the invention, the edge support members 120 may allow for access to the edge couplers 10 such that the edge couplers 10 may be engaged, adjusted, or disengaged before, during, or after the first face 102 and second face 104 of the barrier 100 are operatively coupled to the edge support members 120. In this way, the edge support members 120 may be operatively coupled through the use of mechanical assembly that minimizes the use of welding (e.g., without having to utilize welding, using only some welding, or the like), as will be described in further detail herein.

As illustrated in FIGS. 1 through 7B a barrier core 200 may be operatively coupled to the one or more of the edge support members 120, such as the first edge support member 126 and/or the second edge support member 128. In some embodiments, as illustrated in FIG. 5, the core 200 may be dropped into a barrier cavity created by the edge support members 120 and at least one face 102, 104 of the barrier 100. In some embodiments, the barrier core 200 may be operatively coupled to the top edge support member 122 and/or the bottom edge support member 124. It should be further understood that in some embodiments the core 200 may be operatively coupled to the edge support members 120 through the use of core couplings 280, such as fasteners (e.g., screws, bolts, or the like such as through the webs 136), adhesives (e.g., glue, sealant, tapes, epoxy, liquids that harden, or the like between the webs 136 and core), or the like. In some embodiments a portion of the core 200 is operatively coupled to the edge support members 120 by inserting a portion of the core 200 (e.g., one or more edges of the core 200, such as reduced edge thickness of the core 200) into an inner cavity 139 of the edge support members 120 (e.g., formed from the flanges, or the like). As discussed above, in some embodiments, the core 200 may be operatively coupled to the edge support members 120 through the use of core couplings 280, such as fasteners (e.g., screws, bolts, or the like such as through the webs 136 and/or flanges 132, 134), adhesives (e.g., glue, sealant, tapes, epoxy, liquids that harden), tapes (e.g., structural adhesive tapes, or the like), or the like between the webs 136 and/or flanges 132, 134 and the core 120 that is structural and/or provides high bonding), or the like.

As illustrated in FIGS. 7B and 10, in some embodiments the edge support members 120 may further comprise one or more projections 150 that may be utilized for operative coupling with the barrier faces 102, 104. For example, a first edge member projection 152 may extend from a first edge member flange 132 and/or an edge member outer flange 140 to form a first face cavity 156, while a second edge member projection 154 may extend from a second edge member flange 132 and/or an edge member outer flange 140 to form a second face cavity 158. The first face cavity 156 of the edge support members 120 may be used to secure the first face 102 of the barrier 100, while the second face cavity 158 of the edge support members 120 may be used to secure the second face 104 of the barrier 100. As will be described in further detail with respect to the assembly process of the barrier 100, the edge couplings 10 may only be partially engaged to allow for the assembly of the edge support members 120 and the faces 102, 104 before the edge couplings 10 are fully engaged to bring the end of the edge support members 120 together, as well as to secure the core 200, the first face 102, and/or the second face 104 within the edge support members 120. In some embodiments, a face coupling 160, such as an adhesive, fastener, or the like may also be used between the faces 102, 104 and the edge support members 120 (e.g., the projections 152, 154) to operatively couple and/or seal the faces 102, 104 with the edge support members 120 and/or covers 170 (as will be described in further detail).

Additionally, or alternatively, as illustrated in FIGS. 11A through 11B the first face 102 and/or the second face 104 of the barrier 100 may be operatively coupled to the one or more edge support members 120 through different face couplings 160, such as one or more apertures (e.g., slot, channel, or the like) 162 or tabs 164. As illustrated in FIG. 11A the tab 164 may be operatively coupled to the edge support member 120 (e.g., as a separate member as illustrated in FIG. 11A, or integrally with the edge support member 120—not illustrated). Moreover, as illustrated in FIG. 11B, a portion a face 102, 104 (e.g., an edge of a face) may have an aperture (e.g., slot, channel, or the like) 162 that allows the face 102, 104 to be secured with the edge support members 120 and/or the core 200 through the use of the apertures 162 and tabs 164. It should be understood that while the tabs 162 are illustrated as being operatively coupled to the edge support members 120 and the apertures 162 are illustrated as being on the face 102, 104, the tabs 164 may be located on the face 102, 104 and the apertures 162 may be operatively coupled to the edge support members 120. Alternatively, both components may have apertures 162 and tabs 164.

As illustrated in FIGS. 1 through 4, in some embodiments edge covers 170 may be utilized in order to conceal and/or protect the edge couplers 10 and/or the outer cavity 138 of the edge support members 120. For example, the covers 170 may have a cover projection 172 that forms a profile that can be operatively coupled to edge support projections (e.g., snapped, clipped, or the like around) of the edge support members 120 (as illustrated); however, the cover projections of the cover 170 may be inserted into (e.g., snapped, clipped, or the like) the outer cavity 138 of the edge support members 120 (e.g., through the use of projections that may be squeezed and/or extend into the outer cavity 138—not illustrated). The edge covers 170 may extend the length of the edge support member 120; however, the edge covers may only be needed at specific locations to cover the locations at which the edge couplers 10 are located (e.g., for accessing and engaging or disengaging the edge couplers 10).

FIGS. 12A through 18B illustrate different embodiments of the barrier core 200, which in some embodiments may include one or more layers 202 that may be operatively coupled together. The one or more layers may comprise one or more stiffener layers 210 (e.g., corrugated panels, rolled panels, or the like profile panels with ribs, stiffener rods, or the like), one or more matrix layers 230 (e.g., web layers, such has honeycomb, other webbed layers), one or more solid layers 250 (e.g., liquid layers that turn solid, cushioned layers, hard layers, or the like, such as foam, plastic, insulation, or other like layers), and/or one or more fluid seal layers 270 (e.g., gas layers, such as argon gas sealed layers, or the like).

For example, as illustrated in FIG. 12A through 12E, the core 200 may include one or more stiffener layers 210 formed from one or more stiffener members 212. The one or more stiffener members 212 may be of any shape and size, such as circular, half circle, conical shaped, triangular, rectangular, square, trapezoidal, pentagonal, hexagonal, heptagonal, octagonal, any other polygonal shape, diverging or converging from one side to the other, uniform, non-uniform, or other like shape). It should be further understood that the one or stiffener members 212 may be individual members separated from each other, may be operatively coupled to each other for additional support (e.g., lateral stiffener members operatively coupling the vertical stiffener members), and/or may be operatively coupled to or secured within another layer described herein in order to provide both stiffening and/or other properties to the barrier 100. It should be understood that the stiffener members 212 may be made of any type of material including steel, aluminum, other metal, or the like. However, in some embodiments in order to reduce the amount of steel or other metal used in the barrier 100, the stiffener members 212 may be made of a fiber reinforced polymer (FRP) (e.g., glass fiber reinforced polymer (GFRP), aramid fiber reinforced polymer (AFRP), carbon fiber reinforced polymer (CFRP), carbonized foam, or the like.

As such, a plurality of spaced-apart elongated structural stiffeners 212 may extend substantially between the door edges (e.g., a bottom edge 110 and a top edge 112 and/or a first edge 106 and/or a second edge 108). Although stiffeners 212 are shown extending vertically from the top edge 112 to the bottom edge 110 of the barrier 100, they may extend horizontally from one side to the other, or in any other direction. In some embodiments, the FRP stiffener members may have glass fibers spirally wrapped 54 about the exterior. The FRP stiffener members may be anisotropic or isotropic in mechanical properties, and generally have significantly higher tensile strength and lower modulus of elasticity than steel. As a result, a stiffener made of FRP may be made of comparable or greater strength than steel, with significantly lower mass.

Regardless of the type of the type of stiffener member 212, the diameter (D) of the stiffeners 212 may typically be in the range of 0.25 in to 0.75 in., for example 0.375 in. or 0.5 in. The stiffener diameter (D) may typically be in the range of 20% to 50% of the interior door thickness (DT), and may be in the range of 20% to 30% of DT. The stiffeners 212 may be provided in number and size to provide sufficient structural integrity to maintain the desired strength of the barrier 100. The stiffeners 212 may be sized and spaced from interior surfaces of the faces 102, 104 of the barrier 100 so a gap exists and there is no direct contact between the mid-portions of the stiffeners between ends and the inner surface of the faces 102*m* 104 (e.g., the door skins). This may provide a minimal thermally conductive bridge through the door thickness. In the alternative, the stiffeners may be made of another suitable structural material, for example a metal or alloy such as hollow steel tube of 0.40 in (10 mm) thickness (or other thickness).

To hold the stiffeners 212 in place within the barrier interior, the ends 214 are secured to end caps 240, which are themselves secured to the edge members 120, such as at the top edge 112 and/or bottom edge 110 of the barrier 100, and/or may have cap apertures 242 (e.g., be notched, or the like) for receiving the ends 214 of stiffeners 212. The end caps 240 may be composed of a thermoplastic polymeric material, such as a polycarbonate, or of any other suitable material such as 14, 16, 18, or 20 gauge steel (or another gauge of steel).

As illustrated in FIGS. 12B through 12C, the thermoplastic polymeric end cap 240 may be formed with a honeycomb pattern having a plurality of regularly spaced, patterned apertures 242 (e.g., openings, holes, or the like) between flat surface portions, which apertures 242 may be molded during forming of the thermoplastic, or otherwise formed through the thickness of the polymeric sheet. The end cap apertures 242 may have any desired cross-section, such as circular, square, rectangular or any polygonal shape. The polymeric end cap 240 is both thermally and electrically non-conductive. The sheet dimensions may be sized to fill substantially the entire thickness between the barrier faces 102, 104, or may be of lesser or greater thickness than the interior space formed by the barrier faces 102, 104.

In some embodiments, as illustrated in FIGS. 12D and 12E, the stiffeners 212 may be secured to edge members 120 directly via edge member apertures 180 at opposite ends of the door shell, the edge member apertures 180 corresponding to a cross-section of the ends of the stiffeners 212. In another embodiment, the stiffeners 212 are bonded into the edge member apertures 180 in the edge member apertures 180 that correspond in shape and size to the stiffener ends 214, with an adhesive (e.g., epoxy, glue, or the like). Alternatively, the stiffener ends 214 may be mechanically locked in position by an interference fit into the end cap apertures 180. End cap apertures 180 may serve as relief slots for the stiffener ends 214. Other bonding methods and materials may alternatively or additionally be used to secure the stiffener ends 214, including but not limited other mechanical fasteners, such as a lock washer in edge member apertures 180.

In some embodiments, the end cap 240 and/or the edge members 120 may comprise handling apertures 244 that may be used during manufacturing to hang or otherwise handle the barrier 100 during manufacturing. Additionally, or alternatively, the end cap 240 and/or the edge members 120 may include one or more fill material openings 246, which may be used to allow for filling the barrier will fill material (e.g., insulation, such as expending foam, or the like) to aid in forming the core within the barrier 100.

As will be described in further detail herein, the core 200 of the door may include foam-in place insulation material that expands when provided around the stiffeners 212 between the barrier faces 102, 104. As such, the barrier 100 may have a structural framework that may be made of fiber reinforced polymer (FRP). For example, the reinforced core with thermoplastic end caps reduces (e.g., minimizes, eliminates, or the like) the need for steel end channels used for locating steel stiffeners and the steel channels used for FRP reinforcements, thus reducing the weight of the door. The thermoplastic end channels 240 and FRP reinforced rods 212 also reduce the thermal transfer of the door components. These thermoplastic end channels and FRP reinforced rods 212 can be used in hollow metal, wood, and FRP door designs reducing the number of core types. The FRP may be anisotropic or isotropic in mechanical properties, and generally has significantly higher tensile strength and lower modulus of elasticity than steel. As a result, a stiffener 212 made of FRP may be made of comparable or greater strength than steel, with significantly lower mass. FRP stiffeners 212 are also corrosion resistant and provide dimensional stability to the panel under thermal loading. The insulated door panel of the present invention improves structural integrity, is thermally efficient and provides an outer appearance free of weld marks.

In other embodiments, instead of the stiffeners 212 being in the shape of rods, as illustrated in FIGS. 13A through 13C, the stiffeners 212 may be z-shaped stiffeners. The z-shaped stiffeners may have one or more stiffener apertures 216 that are used to reduce the weight of the barrier 10 and/or allow material (e.g., liquid, foam, or the like) to pass through the stiffeners 212 and expand to form at least a portion of the core 200. It should be understood that the z-shaped stiffeners may be assembled in the same or similar way as described with respect to the stiffeners illustrated in FIGS. 12A through 12D. However, in other embodiments the z-shaped stiffeners 212 may be operatively coupled to one or more of the edge members 120 and/or one or more of the faces 102, 104 through the use of a connector (e.g., welds, adhesives, or the like). It should be further understood that the z-shaped stiffeners may be pre-assembled with one or more layers 202 (e.g., encapsulated within, or the like) in order to form the core 200 that is dropped into the shell to form the barrier 100; however, in some embodiments the one or more stiffeners 212 may be assembled to the one or more of the faces 102, 104 and/or edge members 120 before the one or more layers 202 are formed to create the core 200. While the stiffeners 212 illustrated in FIGS. 13A through 13B are z-shaped, it should be understood that these stiffeners 212 may have other shapes (e.g., u-shaped, c-shaped, hat shaped, dovetail shaped, or the like) and operate in the same or similar way. The stiffeners 212 used (e.g., regardless of shape) may be different sizes such that some of the stiffeners 212 may extend only partially between the faces 102, 104, and/or some of the stiffeners 212 may extend between the faces 102, 104 and/or between one or more liners 103 that are operatively coupled to at least one of the faces 102, 104, as illustrated in FIGS. 13B and 13C. The stiffeners 212 may be made of steel; however, in some embodiments the stiffeners 212 may be made of alternate materials (e.g., non-metals, hybrid material, bio-based materials, carbonized foam, or the like as described herein) in order to utilize more environmentally friendly materials. Moreover, the liner 103 may be a steel liner; however, like the stiffeners 212 the liner 103 may be made of alternate materials. In some embodiments, as illustrated in FIG. 13C, the liner 103 itself may be removed, and the core 200 (e.g., formed in place, drop-in core, or the like) may be formed with the stiffeners 212. However, in some embodiments the stiffeners 212 and liners 103 may be removed and other types of cores 200 may be used in order to utilize more environmentally friendly materials.

FIGS. 13A through 18B illustrate different embodiments of the barrier core 200, which in some embodiments may include one or more layers 202 that may be operatively coupled together. The one or more layers may comprise one or more stiffener layers 210 (e.g., stiffener panels, such as corrugated panels, rolled panels, or the like profile panels with ribs, or the like), one or more matrix layers 230 (e.g., web layers, such has honeycomb, or other webbed layers), one or more solid layers 250 (e.g., liquid for foam layers that turn solid, cushioned layers, hard layers, layers that have solid structure but include spaces of different sizes that are filled with air or other material, or the like, such as foam, plastic, insulation, or other like layers), and/or one or more fluid seal layers 270 (e.g., gas layers, such as argon gas sealed layers, or the like). As will be described in further detail herein, the one or more layers 202 may be made of different materials, however, in some embodiments the one or more layers 202 may be made from biomass material, which may reduce the carbon footprint of the barrier 100 while providing the desired properties. Additionally, or alternatively, as will be described herein in further detail, the one or more layers 202 may include graphite polystyrene. Additionally, or alternatively, as will be described herein the one or more layers may include carbonized foam. Finally, regardless of the type of materials water-based adhesives, sustainable materials, or the like may be used to secure the layers 202, making the barrier more environmentally friendly based on the raw materials used and/or the manufacturing processes, and thus, the barriers described herein may meet or exceed the energy efficiency of traditional barriers and/or provide a reduction of the carbon footprint of the barriers, as will be described herein.

As illustrated in FIGS. 14A through 14E, the core 200 may utilize one or more stiffener layers 210, such as one or more stiffener members 212 in the form of a panel 220 that has one or more ribs 222 located within the panel 220. For example, the one or more ribs 222 may be V-shaped ribs 22, as illustrated in FIGS. 14A, 14B, and 14E; however, it should be understood that the one or more ribs 222 may have any type of shape (e.g., half circle shape, c-shaped, u-shaped, w-shaped (as illustrated in FIG. 14E), z-shaped, trapezoidal shaped, dovetail shaped, s-shaped, wave-shaped (e.g., sinusoidal, or the like), corrugated, or any other uniform, non-uniform, or other like shape). It should be understood that the ribs 222 may project from only one side of the stiffener panel 220, or ribs 222 may project from both sides of the stiffener panel 220. The panel 220 may also have ribs 222 of different shapes and/or sizes, as illustrated in FIG. 14E (e.g., V-shaped and w-shaped in the same panel 220). Moreover, the one or more stiffener panels 214 may be made of any material, such as aluminum, steel, wood, plastic (e.g., polyurethane, polyisocyanurate, enhanced polystyrene, thermoplastic, polycarbonate, PolyEtherEtherKetone (PEEK), Polyvinylidene fluoride or polyvinylidene difluoride (PVDF), borated plastic, or the like), composites, paper, infused, nanotechnology, reinforced hybrid materials, such as fiber reinforced polymer (FRP) (e.g., glass fiber reinforced polymer (GFRP), aramid fiber reinforced polymer (AFRP), carbon fiber reinforced polymer (CFRP), or the like), coated materials, biomass material (as will be described in further detail herein), graphite polystyrene (GPS) material, or the like, and/or combinations of the foregoing. Furthermore, the one or more ribs 212 may be located in any orientation, such as vertical (with respect to the floor, as illustrated in FIG. 3), horizontal (with respect to the floor, as illustrated in FIG. 2), any angle with respect to the vertical or horizontal orientations. It should be understood that the small variations from vertical or horizontal may still be considered vertical or horizonal.

As illustrated in FIGS. 15A through 15E, the core 200 may utilize a single panel 220. However, as will be discussed in further detail herein, FIGS. 15F and 15G illustrates that core 200 may be formed from multiple panels 220 operatively coupled to one or more other layers 202. For example, as illustrated in FIGS. 15F and 15G, two panels layers 210 (e.g., illustrated as w-shaped layers) may be sandwiched around an inner panel layer (e.g., a solid layer 250 of any material, such as polystyrene, polyurethane, composite, or the like) in order to form the core 200 that may be utilized within the barrier 100. While it should be understood that the panels 220 may be made from any material, in some embodiments, as illustrated in FIGS. 15H, 15I, and 15G, the one or more panels 220 may be specifically made from biomass material, carbonized foam, and/or other like materials.

As illustrated in FIGS. 16A through 16C, the core 200 may include one or more matrix layers 230. As will be described in further detail herein, the one or more matrix layers 230 may include a panel that has a plurality of apertures 232 that extend at least partially through (e.g., partially, completely through, or the like) the layer. The plurality of apertures 232 may have any type of shape (e.g., circular, half circle, cone shaped, triangular, rectangular, square, trapezoidal, pentagonal, hexagonal, heptagonal, octagonal, any other polygonal shape, diverging or converging from one side to the other, uniform, non-uniform, or other like shape). In some embodiments, the plurality of apertures may be non-uniform structural configuration that may be dispersed randomly within the matrix. Moreover, the one or more matrix layers 230 may be made of any material, such aluminum, steel, wood, plastic (e.g., polyurethane, polyisocyanurate, enhanced polystyrene, thermoplastic, polycarbonate, PolyEtherEtherKetone (PEEK), Polyvinylidene fluoride or polyvinylidene difluoride (PVDF), borated plastic, or the like), composites, paper, infused, nanotechnology, reinforced hybrid materials, such as fiber reinforced polymer (FRP) (e.g., glass fiber reinforced polymer (GFRP), aramid fiber reinforced polymer (AFRP), carbon fiber reinforced polymer (CFRP), or the like), coated materials, biomass material (as will be described in further detail herein), graphite polystyrene (GPS) material, carbonized foam, or the like, and/or combinations of the foregoing. Furthermore, the one or more apertures 232 may extend at least partially into the one or more matrix layers 230 perpendicular to the outer faces (e.g., front face 234, rear face 236, or the like) of the one or more matrix layers 230. However, in some embodiments, as will be descried in further detail herein, the one or more apertures 232 may extend at any angle from a front face 234 (otherwise described as a first face) to the rear face 236 (otherwise described as a second face 236). For example, the apertures may extend through the faces at an angle of 5, 10, 15, 20, 25, 30, 35, 40, 45, 50, 55, 60, 75, 80, 85, or the like degrees (or any value that ranges between, overlaps, or falls outside of these values). In still other embodiments, instead of extending from the front face 234 to the rear face 236, it should be understood that the one or more apertures 232 may extend between the edges of the matrix layer 230. Alternatively, or additionally, the one or more apertures 232 may be non-uniform and extend in different directions within the matrix layer 230.

As will be described in further detail herein, the one or more solid layers 250 may be any type of material, such as aluminum, steel, wood (e.g., solid wood, made from wood fibers, wood particulates, or the like, or combinations thereof), plastic (e.g., polyurethane, polyisocyanurate, enhanced polystyrene, thermoplastic, polycarbonate, PolyEtherEtherKetone (PEEK), Polyvinylidene fluoride or polyvinylidene difluoride (PVDF), borated plastic, or the like), composites, paper, infused, nanotechnology, reinforced hybrid materials, such as fiber reinforced polymer (FRP) (e.g., glass fiber reinforced polymer (GFRP), aramid fiber reinforced polymer (AFRP), carbon fiber reinforced polymer (CFRP), or the like), coated materials, biomass material (as will be described in further detail herein), graphite polystyrene (GPS) material, or the like, and/or combinations of the foregoing. In some embodiments, the solid layers 250 may be created by utilizing a liquid application within the barrier system 100 which hardens into a solid material. While the solid layer 250 is described as being generally solid, it should be understood that depending on the type of material, the solid layers 250 may have some spaces, such as found within fabric layers (e.g., woven, non-woven, or like), fibers layer (e.g., oriented fiber, non-oriented fibers, or the like), or other like configurations. Moreover, the solid layers 250 may be compressible and/or expandable, such as cushioning material, or other material that may be deformed, expanded, and/or returnable to an original state after deformation and/or expansion. As such, the one or more solid layers 250 may have voids and/or may be compressible or expandable based on the type of material used, but may still be described as being a solid layer 250. Moreover, in some embodiments, multiple sheets may be overlaid to form the solid layer 250, such with one or more fabric sheets, plastic sheets, metal sheets, or other sheets of materials. The sheets may be orientated in the same direction or orientated in different directions such that that the weave, fibers, or the like within the sheets may in different orientations. In other embodiments, the solid layers 250 may be operatively coupled to each other and/or other layers of the core 200 using core couplings 280, such as fasteners (e.g., bolts, screw, nuts, rivets, claps, straps, strings, or the like), adhesives 290 (e.g., liquid sealant, tape, caulk, epoxy, or the like), tapes, or other like couplings.

The core 200 may include one or more fluid seal layers 270. These layers may be sealed layers with different types of fluid, such as gas (e.g., argon, nitrogen, air, or the like), liquids, semi-liquid, or the like that may provide different properties for the core 200, and thus the barrier system 100. The sealed layers may include any type of Vacuum Insulated Panels (VIP). The fluid seal layers 270 may provide insulative properties, or the like depending on the application of the barrier 100. In other examples, the fluids comprise particles suspended within the fluid, such as nano particles, glass materials, magnetic materials, or the like, and/or the fluid may comprise EMI-RFI shielding fluids, magnetorheological fluid, or the like fluid types, which may aid in energy harvesting, energy transfer, creating magnetic fields, or providing other barrier properties discussed herein.

In some embodiments, a curable and hardenable insulation material may be used as a layer 202 of the core 200. For example, the core may use insulation material disposed between adjacent stiffeners 210 (e.g., between rods 212 and/or panels 220) and fills at least a portion of the interior cavity between the faces 102, 104. The insulation material may be expanded foam, such as polyurethane expanding foam that uses a blowing agent. The foam when cured acts to provide thermal insulation through the thickness of the panel. Additionally, the cured foam may adhere to and aid in locking the stiffeners 210 (e.g., rods and/or panels 220) in place to restrict (e.g., reduce, prevent, or the like) movement of the stiffeners 210 from side-to-side (e.g., between edge members 120) and/or between faces 102, 104. Moreover, the stiffener 210 composition may also be selected so that the insulation material, when cured, chemically bonds to the stiffener surface so that the stiffeners 210 and insulation are integral with one another. The use of the stiffeners 210 that are not made of steel or other metals also improves the thermal insulation of the door, since the stiffeners 210 may have improved thermal insulation when compared the stiffeners made of steel or other metals.

In some embodiments, it should be understood that the one or more layers 202 described herein may be formed from graphite polystyrene (GPS) material instead of other types of insulation material. The GPS material may provide improved thermal and air leakage performance resulting in energy savings and reduced environmental impact, when compared to traditional insulation materials. While the GPS material provide improved thermal and air leakage performance, the GPS material will not reduce the performance or structural integrity of the barrier 100. The use of the GPS material aids in achieving a lower carbon footprint of the manufacturing of the layers 202 and/or barriers 100 formed therefrom. In addition to the improved thermal and air leakage performance, the use of GPS material in the one or more layers may provide improved sound abatement (e.g., STC ratings).

In other embodiments, the one or more layers 202 may utilize other types of materials that provide environmental benefits, such as biomass material, and in particular hemp material or bio-based carbonized foam. For example, using biomass material may result in a lighter weight energy efficient core 200 and/or barrier 100 from therefrom. The one or more layers 202 made from the biomass material may be formed through the use of layering composites, pressing a composite material (e.g., such as hemp, carbonized foam, or the like), structural reaction injection molding (SRIM), 3D printed, or the like. The biomass material may provide improved thermal and/or air leakage performance resulting in energy savings. The biomass material may be formed from plant fibers (e.g., generally cellulose fibers, or the like), alone or in combination with other components such a lignin. The bio-based material may include hemp, cotton, jute, flax, ramie, sisal, bagasse, bamboo, coconut, or the like fibers, or combinations thereof. It should be understood that the biomass materials may include only biomass material, or may utilize other types of materials, such polymers, coal, pitches, or the like, and/or other carbon sources (e.g., from biproducts of other industries), which could be combined to form the carbonized foam.

In addition to the biomass material being lighter, in particular configurations it may be utilized as a stiffener 210, such as a stiffener panel 220, and thus, such may reduce (e.g., eliminate or reduce the size of, number of, or the like) other elements (e.g., steel stiffeners, edge members 120, end caps 180, or the like). The use of bio-based material in the core may reduce (e.g., lessen, eliminate, or the like) the use of traditional materials, such as polystyrene, polyurethane, polyisocyanurate, kraft paper honeycomb core, or the like, which reduces the carbon footprint of the door, and/or the manufacturing costs.

The use of the GPS material, the biomass material, the carbonized foam, and/or the other materials described herein may be used as one or more layers 202 within the core 200. For example, a biomass material, such as hemp, may be used along with a carbonized foam in order to provide improved properties of the core 200. As such, regardless of the type of materials, the types of layers 202 (e.g., stiffener, solid, matrix, fluid filled) and/or the size of the barrier (e.g., door that is 1½, 1¾, 2, 2¼, 2½, 2¾, 3, 4, or the like inch thick door, or ranges between, overlaps, or falls outside of these values), the one or more layers 202 described herein may have different thicknesses. For example, any of the for layers 202 having the materials described herein may be 0.02, 0.025, 0.03, 0.035, 0.04, 0.045, 0.05, 0.055. 0.06, 0.065, 0.07, 0.075, 0.08, 0.085, 0.09, 0.095, 0.1, 0.15, 0.2, 0.25. 0.4, 0.5, 0.6, 0.75, 0.9, 1, 1.1, 1.25, 1.4. 1.5, 1.6, 1.75, 1.9, 2.1, 2.25, 2.4. 2.5, 2.6, 2.75, 2.9, 3, 3.1, 3.25, 3.4. 3.5, 3.6, 3.75, 3.9, or the like inches. It should be understood that the thickness of the layers 202 made of any of these materials may range between, overlap, or fall outside of any of these values.

The use of the GPS material, the biomass material, the carbonized foam, and/or the other materials described herein may also result in improvements to the manufacturing process. That is, instead of having to utilize expandable foam made from various materials (e.g., chemicals, polymers, or the like) as the core materials, the GPS material, the biomass material, the carbonized foam, or the like may be pre-formed cut to size using hot table wire instead of other types of separators (e.g., table saw, or the like). Furthermore, the one or more layers 202 made of these materials may be formed to other layers 202 and/or to the faces 102, 104 of the barrier 100 using an adhesive roll coater using a water-based adhesive, verses other types of traditional adhesive applicators (e.g., overhead spray, or the like) which used solvent-based adhesives. The roll coater and the water-based adhesives are more environmentally friendly versus traditional solvent-based adhesives that utilize chemicals and/or applicators (e.g., spray applicators, or the like) that discharge the spray into the air.

Traditional barriers that utilize cores having traditional materials, such as polyisocyanurate cores, have a thermal transmittance (U-value) of approximately 0.46 $W/m^2K$ (e.g., the core itself having a U-value of approximately 0.16 $W/m^2K$) for a standard 1¾ thick door. The lower the U-value the better insulative properties are provided by the barrier and/or core thereof. Alternatively, the GPS material, the biomass material, and/or the carbonized foam material may result in barriers (e.g., having the same face materials, thickness, and configuration as the traditional barrier described above with cores made from polyisocyanurate) having a U-value that is less than 0.46 W/m$^2$K (e.g., 0.45, 0.43, 0.41, 0.4, 0.39, 0.38, 0.37, 0.36, 0.35, 0.34, 0.33, 0.32, 0.31, 0.3, 0.29, 0.28, 0.27, 0.26, 0.25, or the like W/m$^2$K). Alternatively, the core itself may have a U-value that less than 0.16 W/m$^2$K (e.g., 0.15. 0.14, 0.135, 0.13, 0.125, 0.12. 0.115, 0.11, 0.105, 0.1, 0.095, 0.9, 0.085, 0.08, 0.075, 0.07, or the like W/m$^2$K). These core values are known as operational core values that are measured according to ASTM C1363 (as of the date of this filing). These U-values are not calculated U-values that are determined according to ASTM C518 (as of the date of this filing). It should be understood that the U-values described above for the present disclosure may range between, overlap, or fall outside of any of these values.

Traditional doors, when taking into account the raw materials of the door, the transport of the raw materials, the manufacturing of the traditional door (e.g., steel faces, steel supports, steel reinforcements for door hardware, polyisocyanurate cores—expanding foam, solvent-adhesives—spraying, chemical cleaning, welding, or the like), the transportation of the door (e.g., including the weight of the door), or other like factors, may have an approximate carbon footprint of 140 kg (308.65 lbs.). The use of one or more features of the door described in the present invention, that is, the reduced (e.g., reduction or elimination thereof) use of steel, the reduced welding, the reduced use of solvent-adhesives, the use of adhesive rolling and/or water-based adhesives, the improved core having the layers and/or materials described herein, use of mechanical fasteners, or the like may result in a lower carbon footprint. As such, the transport of the raw material, the manufacturing of the improved door, the transportation of the door (e.g., having the reduced weight), or other like factors (e.g., based on transport distances being the same as the traditional doors) may have an approximate carbon footprint of 103.6 kg (228.4 lbs.). That is an approximate reduction of the carbon footprint for manufacturing of the door of approximately 26%. However, it should be understood that depending on the various configurations used for the improved door, the percent reduction of the carbon footprint may be greater than or equal to 5, 7.5, 10, 12.5, 15, 17.5, 20, 22.5, 25, 27.5, 30, 32.5, 35, 37.5, 40, or the like percent reduction in the carbon footprint. It should be understood that the percent reduction described above for the present disclosure may range between, overlap, or fall outside of any of these values.

Traditional doors, as described herein, provide a certain amount of operational energy use depending on the structure in which the door is used and the environment in which the door may be used. However, as described above the operational U-value of the door of the present invention is better than the operational U-value of traditional doors. With all things beings equal (e.g., the structure, installation of the door, temperatures, usage of the barrier, energy used in the structure, life of the door, or the like), operational energy use of traditional doors may be estimated to have a carbon footprint of 135.3 kg (298.3 lbs.), while the carbon footprint of the door of the present invention may be reduced to approximately 102.7 kg (226.4 lbs.). That is, an approximate reduction of the carbon footprint of the use of the door (otherwise described as the operational energy use of the door) of approximately 24%. However, it should be understood that depending on the various configurations used for the improved door, the percent reduction of the carbon footprint for use of the door may be greater than or equal to 5, 7.5, 10, 12.5, 15, 17.5, 20, 22.5, 25, 27.5, 30, 32.5, 35, 37.5, 40, or the like percent reduction in the carbon footprint. It should be understood that the percent reduction described above for the present disclosure may range between, overlap, or fall outside of any of these values.

Depending on the one or more layers 202 (e.g., number of, type, material thereof) of the core, it should be understood that one or more layers 202 of the core 200 may provide different properties depending on the requirements for the use of the barrier 100. For example, the core 200, alone or in combination, with the other components of the barrier 100 (e.g., the face skins, or the like) may provide sound abatement (e.g., STC rated, or the like ratings), forced entry (FE) and/or ballistic resistance (BR) (collectively "FEBE"), blast resistance, electromagnetic compatibility shielding (e.g., electromagnetic interference (EMI) and/or radio frequency interference (RFI) shielding), gamma shielding (e.g., lead free shielding, or the like), attack resistance, energy harvesting, energy storage (e.g., core 100 provides on demand energy for providing energy to door hardware, sensors, cameras, security readers, display panels on the barrier, or the like), fire rated, FEMA rated, seismic rated, weather rated (e.g., water, flood, hurricane, or the like protection), or other protection, and/or combinations thereof.

As described above, in some embodiments the one or more layers of the core 200 may be combined in order to provide different properties for the barrier 100. As illustrated in FIG. 15A, in some embodiments the core 200 may include a stiffener layer 210 (e.g., stiffener panel 220) operatively coupled to a solid layer 250, such as a solid insulation layer 250 (e.g., a poly layer, GPS layer, a biomass layer, a carbonized foam layer, or the like layer). As illustrated in FIG. 15A, the stiffener layer 210 may be sandwiched with the solid layer 250 back-to-back, such that the ribs 222 of the stiffener layer 210 contact a surface of the solid layer 250, without the solid layer material filling the areas between the adjacent ribs 222 (e.g., area between the ribs 222 are exposed to the air).

In other embodiments, as illustrated in FIG. 15B, the core 200 may include a stiffener layer 210 operatively coupled to a solid layer 250 (e.g., as described herein) that fills the spaces between the ribs 222 on one side of the stiffener layer 210 (e.g., stiffener panel 220). As illustrated in FIG. 15B, the stiffener layer 210 may be sandwiched with the solid layer 250 back-to-back, such that the ribs 222 of the stiffener layer 210 contact a surface of the solid layer 250, and the solid layer 250 extends into the areas between the ribs 222 on one side of the stiffener layer 210. In some embodiments, the solid layer 250 may be formed to mate with the ribs 222 of the stiffener layer 210, while in other embodiments, the solid layer 250 is formed by applying an expandable material (e.g., liquid, foam, or other like expandable material) to one side of the stiffener layer 210 which then hardens into the required shape. In some embodiments, the solid layer 250 may be chemically bonded to at least on side of the stiffener panel 220. For example, expanding material, such as foam in place polyurethane, may chemically bond with the stiffener panel 220, or other stiffener layers 210, and/or a hybrid/alternate material/polycarbonate end cap 140 and/or other barrier components on at least some of the surfaces of the stiffener layers 210.

As illustrated in FIG. 15C, similar to FIGS. 15A and 15B, the core 200 may include a stiffener layer 210 operatively coupled to a solid layer 250 (e.g., as described herein); however, the solid layer 250 fills the spaces between the ribs 222 on both sides of the stiffener layer 210. As illustrated in FIG. 15C, the stiffener layer 210 may be sandwiched within the solid layer 250 (or between two solid layers 250), such that the ribs 222 of the stiffener layer 210 contact surfaces of the solid layer(s) 250 on both sides, and the solid layer(s) 250 extend into the areas between the ribs 222 on one side of the stiffener layer 210 and between the ribs 222 on the opposing side of the stiffener layer 210 (e.g., stiffener panel 220). As previously described, the solid layer 250 may be formed to mate with the ribs 222 of the stiffener layer 210, while in other embodiments, the solid layer 250 is formed by applying an expanding material (e.g., liquid, foam, or other expandable material) to both sides of the stiffener layer 210 which then hardens into the illustrated shape. Moreover, while the figures illustrate the ribs 222 extending on only one side the panel 220 of the stiffening layer 210, it should be understood that the ribs 222 may extend from both sides of the panel 220.

In other embodiments, as illustrated in FIG. 15D, the stiffener layer 210 may be operatively coupled with multiple types of solid layers 250. For example, FIG. 15D may be the same as or similar to the core 100 illustrated in FIG. 15A, with an additional layer 202. For example, the additional layer may include a solid layer 250, such as fiber glass, rockwool, layered fabric, or other like material. In other embodiments, the additional layer may be a fluid filled layer 270, such as a vacuum insulated panel (VIP) that is filled with a fluid (e.g., gas, liquid, or the like) and sealed to provide insulation. For example, VIPs are a highly efficient types of thermal insulation. The VIPs may consist of a porous core board of non-combustible fumed silica that is mixed with fibers and/or an opacifier (e.g., to make the system opaque). The rigid core board is evacuated from air and sealed in a gas and water-tight envelope, typically a metalized multilayer film, or the like. The thickness of the VIPs determine the thermal performance, and VIPs typically outperform the thermal efficiency of traditional insulation materials.

FIG. 15E illustrates another embodiment, in which a stiffener layer 210 is operatively coupled to a matrix layer 230, which will be described in further detail herein. In other embodiments, FIGS. 15F and 15G illustrates another embodiment in which two stiffener layers 210 are operatively coupled to a solid layer 250, which forms a w-shaped core 200. As illustrated, the core 200 may be installed into the barrier 100 and portions of the w-shaped core 200 may contact the interior surfaces of the faces 102, 104 of the barrier 100. The spaces between the faces 102, 104 and the w-shaped core 200 may be left as air or may be filled with another material. While the core 200 in FIGS. 15F and 15G is illustrated as being w-shaped, it should be understood that multiple stiffener layers 210 of any shape (e.g., half circle shape, V-shaped, c-shaped, u-shaped, w-shaped, z-shaped, trapezoidal shaped, dovetail shaped, s-shaped, wave-shaped, or any other uniform, non-uniform, or other like shape) may be operatively coupled to any type of layer to form the core 200.

FIGS. 15H through 15J illustrates different embodiments of the invention in which the stiffener panel 220 may be formed of multiple layers 202. For example, as illustrated in 15H the stiffener panel 220 may be formed from a first W-shaped panel portion and a second flat panel portion operatively coupled together. Alternatively, the stiffener panel 220 may be formed from a first flat panel portion, a second W-shaped panel portion (e.g., intermediate panel portion), and/or a third flat panel portion. In still other embodiments, the stiffener panel 220 may be formed from a first flat panel portion (e.g., a first outer panel portion), a second W-shaped panel portion (e.g., a first intermediate panel portion), a third flat panel portion (e.g., a second intermediate panel portion), a fourth W-shaped panel portion (e.g., a third intermediate panel portion), and/or a fifth flat panel portion (e.g., a second outer panel portion). While the stiffener panel 220 may be made of one or more panel portions of any type of material, as described herein, in some embodiments, the one or more panel portions may be made of GPS material, biomass material, carbonized material, or the like as previously described herein. Moreover, as previously discuss herein, while the panel portions are illustrated as w-shaped panel portions, the panel portions may be V-shaped, u-shaped, c-shaped or the like. In particular embodiments, the stiffener panel 220 may be formed from biomass material. As previously discussed herein, the biomass material (or other materials described herein) may provide improved thermal properties, a reduced weight, and/or improved structural integrity that allows for the reduction and/or removal of edge members 120, end caps 140, and/or other features of traditional barriers, which further reduces the weight of the barrier 100.

It should be understood that the ribs 222 of the stiffener panel 220 may not only be of any shape, as described above, but may also be of any size and number. That is, in some embodiments the heights of the ribs 222 may extend between the entire inner opening between the first face 102 and the second face 104. However, it should be understood that the ribs 220 may extend over 20, 25, 30, 35, 40, 45, 55, 60, 65, 70, 75, 80, 85, 90, and/or 95 percent of the distance between the inner surfaces of the first face 102 and/or the second face 104, at any locations between the first face 102 and second face 104 (e.g., extending from the inner surface of either face, or located at any location between the faces 102, 104). Moreover, it should be understood that the ribs 222 may range between any of these percentages, overlapping any of these percentages, and/or falling outside of any of these percentages. It should be further understood that the stiffener panel 220 may have any number of ribs 222, such as 1, 2, 3, 4, 5, 6, 7, 8, 9, 10, 12, 14, 16, 18, 20, 25, 30, 40, 50, or the ribs. Moreover, it should be understood that the number of ribs 222 may range between any of these values, overlap any of these values, and/or fall outside of any of these values. Finally, as previously discussed herein the ribs 222 may have any orientation(s), pattern(s), or the like.

It should be understood that regardless of the type of stiffener layer 210 (e.g., stiffener panel 220) and/or the type of material used, the stiffener layer 210 may reduce the weight of the barrier 100 by reducing the typical steel supports, edge members, end caps, thickness of the faces 102, 104, or the like. As such, the door system of the present invention, depending on the type of the layer 202 and/or the material of the layer 202, may reduce the weight of the door by at least 5, 10, 15, 20, 25, 30, 35, 40, 50, or the like lbs. However, it should be understood that weight reduction of the door may range between any of these values, overlap any of these values, and/or fall outside of any of these values. The reduced weight of the door will reduce the weight requirements for the barrier hardware (e.g., door hinge hardware, or the like) and/or reduce the wear and tear on the barrier hardware, which reduces the costs of the barrier system, as well as reducing the shipping costs due to the weight of the barrier 100. Moreover, lighter weight barriers 100 are easier to install, thus reducing installation times and costs.

Furthermore, the use of the stiffener panels 220 may provide improved thermal performance, air infiltration, sound abatement (e.g., STC rating, or the like), stiffness, structural performance, or the like. Moreover, the layers 202 may be used in any type of door such as, hollow metal doors, fiber reinforced polymer (FRP) doors, wood doors, aluminum door, or the like.

Additionally, or alternatively, as previously discussed herein, the one or more layers 202 may include a matrix layer 230, as illustrated in FIGS. 16A through 16C. As illustrated in FIG. 16A, the conical matrix layer 230 may comprise a plurality of apertures 232 that have a conical shape. For example, as illustrated in FIG. 16B, a plurality of first apertures 232 extend into and converge from a first matrix face 234 toward a location adjacent the second matrix face 236, while a plurality of second apertures 232 extend into and converge from a second matrix face 236 toward a location adjacent the first matrix face 234. Alternatively, the matrix layer 230 may be similar to the honeycomb matrix layer 230 illustrated in FIG. 16C. As illustrated in FIG. 16C, the honeycomb matrix layer 230 comprise a plurality of honeycomb apertures (e.g., having five sides in the illustrated embodiment), which extend from a first matrix face 234 at an angle towards the second matrix face 236. It should be understood, that while the matrix layer 230 is illustrated as having a plurality of apertures 232 in the first matrix face 234 and/or the second matrix face 236, the plurality of apertures 232 may extend at least partially into and/or through one or more of the edges of the matrix layers 230.

As illustrated in FIG. 17A, the one or more matrix layers 230 in the core 200 may be utilized without the stiffener layer 210, and instead using one or more solid layers 250. For example, FIG. 17A illustrates utilizing a first matrix layer 230 in which the plurality of apertures 232 extend from a first matrix face 234 to a second matrix face 236 in a first direction (e.g., toward the right at 45 degrees, as illustrated). The core in FIG. 17A further utilizes a solid layer 250 operatively coupled to the first matrix layer 230. The solid layer 250 may be any type of layer as previously discussed herein. FIG. 17A further illustrates that a second matrix layer 230 that is operatively coupled to the second side of the solid layer 250, in which the plurality of apertures 232 extend from a first matrix face 234 toward a second matrix 236 face in a second direction (e.g., toward the left at 45 degrees, as illustrated).

In other embodiments of the invention, the core 200 may comprise of a solid layer 250 sandwiched between two matrix layers 230 (e.g., the same as or similar to the core 200 illustrated in FIG. 17A) and operatively coupled to a stiffener layer 210, as illustrated in FIGS. 17B and 17C. Moreover, as illustrated in FIG. 17B, the core 200 can be dropped into a portion of the barrier 100 (e.g., a shell formed from edge member(s) 120, a face 102, 104, or the like).

FIGS. 18A and 18B further illustrate the use of two or more matrix layers 230 operatively coupled together. For example, as illustrated in FIGS. 18A and 18B, the core may have a first matrix layer 230 operatively coupled to a second matrix layer 230 in which the plurality of apertures 232 are directed in different orientations. Moreover, as illustrated in FIGS. 18A and 18B, a third matrix layer 230 may be operatively coupled to the second matrix layer 230 and has a plurality of apertures 232 that are directed in a different orientation than the second matrix layer 230, and which may be in the same or different orientation as the first matrix layer 230. Finally, as illustrated in FIGS. 18A and 18B, a fourth matrix layer 230 is operatively coupled to the third matrix layer 230 and has a plurality of apertures 232 that are directed in a different orientation than the third matrix layer 230 (and the first matrix layer 230 in some embodiments), and which may be in the same or different orientation as the second matrix layer 230. It should be understood that in some embodiments, the openings of a plurality of apertures 232 (extending in a first orientation) within one matrix layer 230 may line up with the openings of a plurality of apertures 232 (extending in the first orientation, or in a second orientation). In this way, a cavity may extend from a first face of the core 200 to a second face of the core 200, which may extend in single direction therethrough (e.g., at an angle, straight through the faces, or the like), or may extend at different angles through the core 200. In other embodiments, the openings of a plurality of apertures 232 (extending in a first orientation) within one matrix layer 230 may fail to line up with the openings of a plurality of apertures 232 (extending in the first orientation, or in a second orientation). In this way, the openings may be offset from each other such that the plurality of apertures 232 do not form a plurality of apertures 232 that extend from the first face through the second face of the core 200.

It should be understood that the matrix layer 230 may be made out of any of the materials discussed herein. Moreover, the matrix layer 230 may have the same or similar benefits as discussed herein with respect to the one or more layers 202, and thus the cores 200 and barriers 100 formed therefrom, as previously discussed herein.

FIG. 19 illustrates a process for assembling the barrier 100. As illustrated in block 402 of FIG. 19, the components of the barrier are procured. In some embodiments the components are purchased from a third party, manufactured, and/or procured from a combination thereof. For example, the edge members 120, the edge couplings 10, the barrier faces 102, 104, the barrier couplings 160, the core 200 (e.g., the layers 202 thereof), the core couplings 280, or the like are purchased and/or manufactured.

Block 404 of FIG. 19 illustrates that at least a portion of the core 200 is created. For example, one or more layers are determined, purchased, manufactured, or the like for the particular application of the barrier 100. For example, the one or more stiffener layers 210, the one or more matrix layers 230, the one or more solid layers 250, and/or the one or more fluid sealed layers 270 may be created and operatively coupled together. The one or more layers of the core 200 are operatively coupled together through the use of core couplings 280. The core couplings 280, as previously described herein may be fasteners, adhesives, or the like, or combinations thereof, as previously described herein.

FIG. 19 further illustrates in block 406 that two or more edge members 120 are operatively coupled together through the use of the one or more edge couplings 10. For example, the tie member(s) 20, the bearing member(s) 30, and/or the fastener(s) 40 may be used to operatively coupled two or more edge support members 120 together. In other examples, instead of being assembled through mechanical couplings, the edge members 120 may be operatively coupled through the use of welding with each other and/or the faces 102, 104 of the barrier. In some embodiments, in order to allow for the assembly of the core 200 and/or the faces 102, 104, to the edge support members 120, only two or three edge support members 120 may be assembled in order to allow the core 200 and/or faces 102, 104 to be slid into the edge support members 120 (e.g., into the internal cavities 150, the first face cavities 156, and/or the second face cavities 158 of the edge support members 120). Additionally, or alternatively, in order to allow for the assembly of the core 200 and/or the faces 102, 104, to the edge support members 120, the edge couplings 10 may only be partially assembled and not fully engaged to allow the core 200 and/or faces 102, 104 to be slid into the edge support members 120 (e.g., into the internal cavities 150, the first face cavities 156, and/or the second face cavities 158 of the edge support members 120).

In other embodiments, the one or more edge support members 120 are operatively coupled through the use of the core 200. For example, a portion of the core 200 may be operatively coupled to the one or more edge support members 120, such as by inserting the core 200 into the inner cavities 139 of the one or more edge support members 120. The core 200 may be operatively coupled to the one or more edge support members 120 through the use of the core couplings 280, as previously discussed herein. For example, mechanical fasteners may extend through at least a portion of the edge support member 120 and/or the flanges 132, 134, of the edge support members 120. Alternatively, adhesives (e.g., solvent-based adhesive, water-based adhesive, or the like) may be used to secure the core 200 to the edge support members (e.g., to the web 136, one or more inner cavities 139, or the like of the edge support members 120).

As illustrated in block 408, in some embodiments one of the two faces 102, 104 may be operatively coupled to the one or more edge support members 120. For example, a face 102, 104 may be operatively coupled to the one or more edge support members 120 by sliding the face 102, 104 into one or more face cavities 156, 158 formed in the edge support members 120, through the use of the face couplings 160, through the use of the edge covers 170, or the like.

FIG. 19 further illustrated in block 410 that at least a portion of the core 200 is assembled to the barrier 100. For example, when the core 200 is not previously operatively coupled to the two or more edge support members 120 (as described with respect to block 406), the core 200 may be operatively coupled to the two or more edge support members 120 after the at least one face 102, 104 is installed (e.g., a partially formed shell). For example, the core 200 having the one or more layers, or a portion thereof, may be dropped into the partially assembled barrier 100 before assembling the remainder of the edge support members 120 and/or at least one face 102, 104. Additionally, or alternatively, when the core 200 is at least partially an expandable material (e.g., liquid, foam, or the like that expands to form the core by hardening into a solid layer 250, is a fluid that sealed within a fluid seal layer 270, or the like), the expandable material may be applied to a barrier 100 created by the one or more edge support members 120 and one or more faces 102, 104 of the barrier 100. In some embodiments, the expandable material hardens into a solid layer 230 to create at least a portion of the core 200.

Block 412 of FIG. 19 further illustrates that the one or more faces 102, 104 of the barrier 100 are assembled to the one or more edge support members 120. For example, when a first face 102 has been previously assembled (e.g., to create a cavity to hold a liquid layer of the core 200 before it hardens) to the one or more edge support members 120, the second face may be operatively coupled to the opposing side of the one or more edge support members 120. Alternatively, when the first face 102 has not been previously assembled (e.g., when the core is pre-assembled to the one or more edge support members 120 as described with respect to block 406), the first face 102 and/or the second face 104 are operatively coupled to the edge support members 120, such as through the use of the one or more face cavities 156, 158 formed in the edge support members 120, through the use of the face couplings 160, through the use of the edge covers 170, or the like.

FIG. 19 further illustrates in block 414 that the one or more edge couplers 10 are engaged (e.g., assembled, further engaged, or the like) to secure the edge support members 120, core 200 and/or the faces 102, 104 together (e.g., to bear against a portion of the components and pull the components together to restrict movement of the components with respect to each other). As such, in some embodiments the barrier 100 of the present invention may be assembled without the use of welding. However, it should be understood that in some embodiments the edge members 120 and/or the faces 102, 104 may be operatively coupled through traditional welding processes, structural adhesives, or other like connections.

Block 416 of FIG. 19 further illustrates that hardware may be operatively coupled to the barrier 100. For example, hinges, locks, or the like may be operatively coupled to the edge support members 120 and/or other members within the barrier 100. In some embodiments, the outer cavity of the edge support members 120 may provide a location in which to assemble the barrier hardware. In alternate embodiments, the hardware may be operatively coupled to the barrier 100 before, during, or after the edge members 120, the core 200 and/or the faces 102, 104 are operatively coupled together.

FIG. 19 further illustrates in block 418 that in some embodiments one or more edge covers 170 are operatively coupled to the one or more edge support members 120, other members, and/or the barrier faces 102, 104 of the barrier 100, if needed depending on the configuration of the barrier 100. For example, the one or more edge covers 170 may be snapped, clipped, secured using fasteners, or the like to the entire length of the edge support members 120, a portion of the length of the edge support members 120, localized apertures in the edge support members 120, or the like. As discussed herein, the one or more edge covers 170 may be utilized to hide and/or provide access to the edge couplers 10, to provide aesthetic enhancements to the barrier 100, hide a portion of the edge support members 120, the faces 102, 104, and/or hide other door hardware, or provide other like benefits.

Traditional doors incorporate steel stiffened "hat" reinforcements and similar design technology for steel stiffened doors. These doors may experience "thermal bow" due to a large delta T between the interior and exterior of the door. Moreover, other types of steel stiffened doors may use other types of steel reinforcements, steel end caps, components, steel liners, or the like that add weight to door. These steel reinforcements, steel liners, steel end caps, or other steel components conduct cold and heat and increase the thermal transfer from the interior door surfaces to exterior door surfaces. Moreover, steel is not dimensionally stable under thermal loading. These factors negatively impact the energy efficiency of the door thermal performance for restricting thermal transfer. Moreover, steel is vulnerable to corrosion and rusting, and the total weight of the door impacts hardware wear and tear, product lifecycle and cost of ownership, as well as freight and shipment costs of raw components and finished goods.

It should be understood that the barrier 100 described herein provides improved barriers 100 that can be customized with different cores for different purposes, reduces (e.g., lessens, eliminates, or the like) the use of steel (e.g., uses the stiffener layer to replace other steel reinforcements, end caps, liners, or the like), reduces (e.g., lessens, eliminates, or the like) the need for welding (e.g., reduces the need for grinding, reduces the need for cleaning, provides an improved appearance without welds, or the like), reduces (e.g., lessens, eliminates, or the like) the weight of the barriers (e.g., which reduces shipping costs, reduces wear and tear of the barrier hardware, and/or increases the life of the barrier and hardware), reduces the carbon footprint of the barriers (as previously described), improves energy efficiency (as previously described) and/or because steels are conductive for thermal transfer, and/or the reduction of steel increases stability.

The barrier 100 of the present disclosure provides similar or improved thermal efficiency, air leakage performance, nano coatings, reflective or absorptive technology, energy harvesting, energy storage, and the like resulting in energy savings and lower costs. The properties, features, performance and protection levels of the barrier 100 can be scalable and offer various levels of shielding, security, protection by mixing, matching, alternating layers, orientation, direction of materials, and/or combinations thereof.

The barrier 100 of the present disclosure provides improved cores that reduces the use of steel and/or traditional core materials (e.g., poly materials) and/or reduces the need for welding, and thus, it allows for use of pre-finished materials, hybrids, films, cores, or the like that results in a more sustainable barrier 100. Reduction of steel and/or poly materials reduces the cost, waste and need for pre-treatment, washing, priming, painting of the metal components that provides more environmentally friendly, aesthetic, and/or lighter weight design; however, the barrier 100 of the present disclosure still meets or exceeds product performance, market, and code requirements typically provided by barriers using steel components, traditional cores, and/or that require welding.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "distal," "proximal," "upper," "top," "bottom," "lower," "left," "right," "horizontal," "vertical," "upper," and "lower", or other like terminology merely describe the configuration shown in the figures. The referenced components may be oriented in an orientation other than that shown in the drawings and the terminology, therefore, should be understood as encompassing such variations unless specified otherwise. It will be understood that when an element is referred to as "operatively coupled" to another element, the elements can be formed integrally with each other, or may be formed separately and put together. Furthermore, "operatively coupled" to can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A barrier comprising:
- a first face;
- a second face; and
- a core located between the first face and the second face, wherein the core comprises:
  - one or more stiffener layers;
  - one or more solid layers that provide thermal protection; and
  - one or more core couplings operatively coupling the one or more stiffener layers to the one or more solid layers;
- wherein the one or more stiffener layers are at least partially located within at least a portion of the one or more solid layers; and
- wherein at least one of the one or more solid layers are formed from a graphite polystyrene (GPS) material, a biomass material, or a carbonized foam;
- wherein the first face and the second face are operatively coupled to the core or to each other;
- wherein the core has a U-value that is less than or equal to 0.15; and
- wherein the barrier with the core is a door having a combined U-value that is less than or equal to 0.43.

2. The barrier of claim 1, wherein the door has a thickness of 1.75 inches or less and the U-value less than or equal to 0.40.

3. The barrier of claim 1, wherein the one or more core couplings at least comprise an adhesive for operatively coupling the one or more stiffener layers to the one or more solid layers.

4. The barrier of claim 1, wherein the one or more stiffener layers comprise:
- two or more stiffener members;
- wherein the one or more solid layers are shaped to mate with the two or more stiffener members; and
- wherein the two or more stiffener members are at least partially located within at least the portion of the one or more solid layers.

5. The barrier of claim 1, wherein the one or more stiffener layers comprise:
- a stiffener panel with a plurality of ribs;
- wherein the one or more solid layers are shaped to mate with the stiffener panel; and
- wherein the plurality of ribs are at least partially located within at least the portion of the one or more solid layers.

6. The barrier of claim 1, wherein the one or more stiffener layers comprise:
- a plurality of stiffener panels each with one or more ribs;
- wherein the one or more solid layers are shaped to mate with the plurality of stiffener panels; and
- wherein the one or more ribs of the plurality of stiffener panels are at least partially located within at least the portion of the one or more solid layers.

7. The barrier of claim 6, wherein the plurality of stiffener panels comprise a single rib, and wherein the single rib comprises a trapezoidal shape, a v-shape, a u-shape, a c-shape, a dovetail shape, or a w-shape.

8. The barrier of claim 3, wherein at least one of the one or more solid layers comprise:
- a wood, a plastic, a composite, a paper, or a fiber layer.

9. The barrier of claim 1, wherein a carbon footprint of the door is reduced by greater than 5%.

10. The barrier of claim 1, wherein the at least one of the one or more solid layers are formed from the GPS material.

11. The barrier of claim 1, wherein the at least one of the one or more solid layers are formed from the biomass material.

12. The barrier of claim 1, wherein the at least one of the one or more solid layers are formed from the carbonized foam.

13. The barrier of claim 1, wherein the first face or the second face at least partially form one or more edge members of the barrier.

14. The barrier of claim 1, further comprising:
one or more edge support members operatively coupled to the first face or the second face and surrounding the core.

15. The barrier of claim 14, wherein the edge support members comprise:
a top edge support member;
a bottom edge support member;
a lock edge support member; and
a hinge edge support member.

16. The barrier of claim 15, wherein the edge support members are operatively coupled through edge couplings, wherein the edge couplings are mechanical fasteners.

17. The barrier of claim 14, wherein the one or more edge support members comprise:
a first flange;
a second flange;
a web operatively coupling the first flange with the second flange, and
wherein the first flange, the second flange, and the web form one or more cavities for receiving the core of the barrier or an edge coupling.

18. The barrier of claim 17, wherein the first flange, the second flange, and the web of the one or more of the edge support members form an H-shaped edge support member having an outer channel and an inner channel, and wherein the inner channel of the H-shaped edge support member receives a portion of the core.

19. A method of assembling a barrier assembly comprising:
assembling a core, wherein the core comprises:
one or more stiffener layers;
one or more solid layers that provide thermal protection; and
one or more core couplings operatively coupling the one or more stiffener layers to the one or more solid layers; and
assembling a first face and a second face to each other or to the core;
wherein the one or more stiffener layers are at least partially located within at least a portion of the one or more solid layers;
wherein at least one of the one or more solid layers are formed from a graphite polystyrene (GPS) material, a biomass material, or a carbonized foam;
wherein the core has a U-value that is less than or equal to 0.15; and
wherein the barrier with the core is a door having a combined U value that is less than or equal to 0.43.

20. The method of claim 19, wherein the one or more stiffener layers comprise:
a plurality of stiffener panels each with one or more ribs;
wherein the one or more solid layers are shaped to mate with the plurality of stiffener panels; and
wherein the one or more ribs of the plurality of stiffener panels are at least partially located within at least a portion of the one or more solid layers.

* * * * *